United States Patent
Nidumolu et al.

(10) Patent No.: US 10,841,160 B2
(45) Date of Patent: Nov. 17, 2020

(54) SYSTEM AND METHOD FOR PROCESSING MESSAGES DURING A REBOOT OF A NETWORK DEVICE

(71) Applicant: Arista Networks, Inc., Santa Clara, CA (US)

(72) Inventors: Kalyan Nidumolu, Fremont, CA (US); Avininder Grewal, Langley (CA); Aaron Payment, Coquitlam (CA); Sandeep Gawai, San Francisco, CA (US); Manjula Gopalakrishnan, Cupertino, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/194,216

(22) Filed: Nov. 16, 2018

(65) Prior Publication Data
US 2020/0153682 A1     May 14, 2020

Related U.S. Application Data

(60) Provisional application No. 62/757,674, filed on Nov. 8, 2018.

(51) Int. Cl.
| | |
|---|---|
| *H04L 12/24* | (2006.01) |
| *G06F 8/65* | (2018.01) |
| *G06F 9/4401* | (2018.01) |
| *H04L 29/12* | (2006.01) |
| *H04L 12/709* | (2013.01) |
| *H04L 29/08* | (2006.01) |
| *H04L 12/751* | (2013.01) |

(52) U.S. Cl.
CPC .............. *H04L 41/082* (2013.01); *G06F 8/65* (2013.01); *G06F 9/4416* (2013.01); *H04L 41/0816* (2013.01); *H04L 45/245* (2013.01); *H04L 61/103* (2013.01); *H04L 67/16* (2013.01); *H04L 45/02* (2013.01)

(58) Field of Classification Search
CPC .................................................... H04L 41/082
USPC ......................................................... 709/221
See application file for complete search history.

(56) References Cited

U.S. PATENT DOCUMENTS

| | | | |
|---|---|---|---|
| 6,785,843 B1 | 8/2004 | McRae et al. | |
| 7,340,638 B2 | 3/2008 | Nicholson et al. | |
| 7,453,797 B2 | 11/2008 | Deval et al. | |
| 7,673,131 B2 | 3/2010 | Azzarello et al. | |
| 7,827,397 B2 | 11/2010 | McCoull et al. | |

(Continued)

OTHER PUBLICATIONS

U.S. Appl. No. 15/640,256, filed Jun. 30, 2017, Wen.

(Continued)

*Primary Examiner* — David R Lazaro
*Assistant Examiner* — Zia Khurshid
(74) *Attorney, Agent, or Firm* — Haley Guiliano LLP

(57) ABSTRACT

In some implementations, a method is provided. The method includes determining that a network device will perform a reboot. The method also includes saving state information. The state information comprises data used by the network device to process address resolution protocol (ARP) messages. The method further includes initiating the reboot of the network device. The method further includes initiating a first ARP service. The first ARP service is configured to process ARP messages during the reboot of the network device.

15 Claims, 13 Drawing Sheets

(56) References Cited

U.S. PATENT DOCUMENTS

| | | |
|---|---|---|
| 8,589,667 B2 | 11/2013 | Mujtaba et al. |
| 8,782,632 B1 | 7/2014 | Chigurapati et al. |
| 8,943,489 B1 | 1/2015 | Qu |
| 9,141,373 B2 | 9/2015 | Capper |
| 2007/0291727 A1 | 12/2007 | Hellum et al. |
| 2011/0153697 A1 | 6/2011 | Nickolov et al. |
| 2011/0302638 A1 | 12/2011 | Cha et al. |
| 2012/0023309 A1 | 1/2012 | Abraham et al. |
| 2012/0166618 A1 | 6/2012 | Dahod et al. |
| 2014/0033188 A1 | 1/2014 | Beavers et al. |
| 2014/0321265 A1* | 10/2014 | Pitchai ................ G06F 11/2097 370/219 |
| 2015/0040115 A1* | 2/2015 | Capper .................... G06F 8/65 717/171 |
| 2017/0097922 A1* | 4/2017 | Kirtkow .............. G06F 3/04845 |
| 2019/0007260 A1 | 1/2019 | Wen et al. |

OTHER PUBLICATIONS

U.S. Appl. No. 14/449,030, filed Jul. 31, 2014, Capper.
Chain-loading—GNU GRUB Manual 2.00 located at http:/www.gnu.org/software/grub/manual/html_node/Chain_002dloading 2012.

* cited by examiner

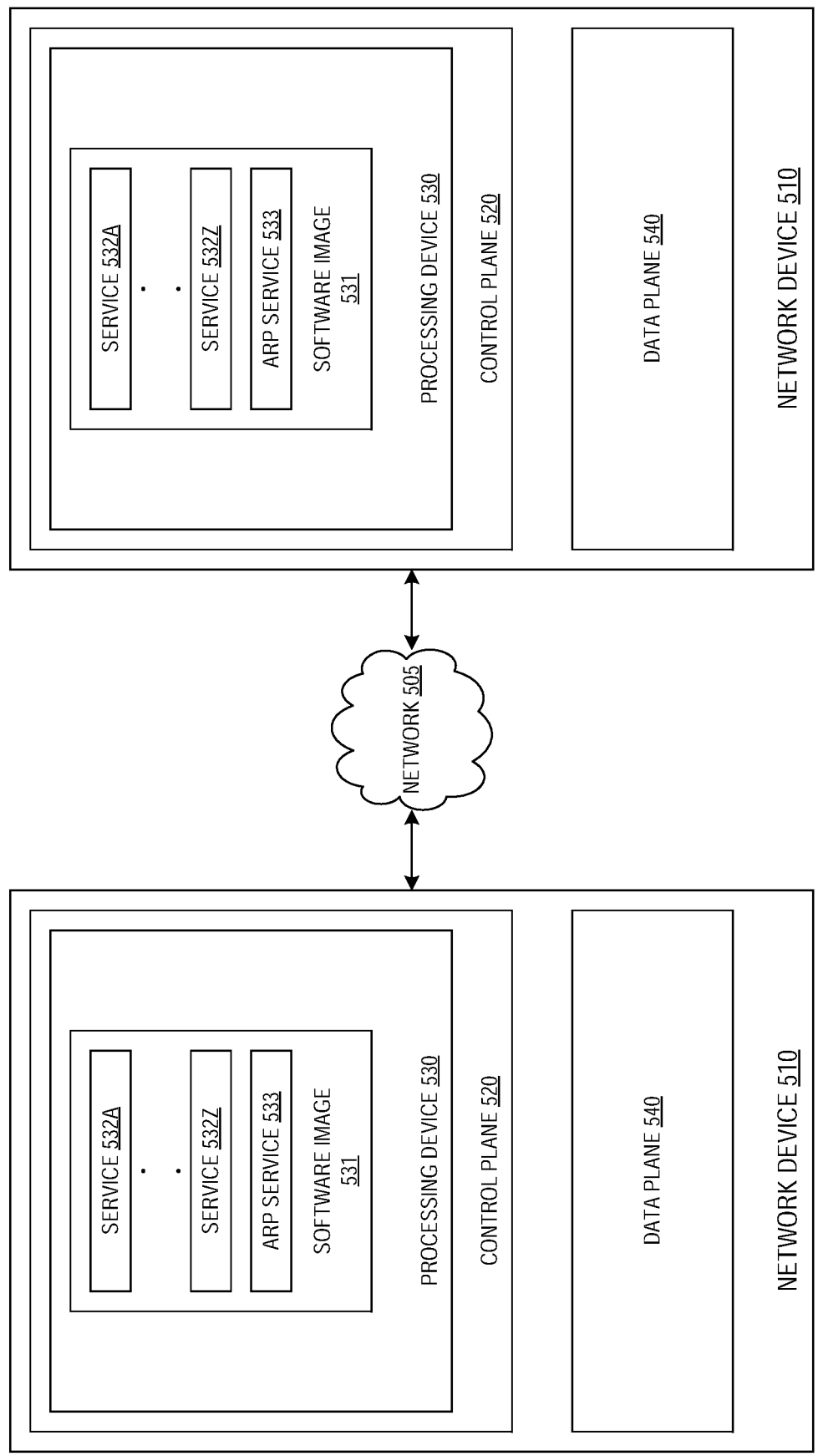

SYSTEM AND METHOD FOR PROCESSING MESSAGES DURING A REBOOT OF A NETWORK DEVICE

CROSS REFERENCE TO RELATED APPLICATIONS

This application claims the benefit of U.S. Provisional Patent Application No. 62/757,674, filed on Nov. 8, 2018. The disclosure of the above-referenced application is hereby incorporated by reference in its entirety.

BACKGROUND OF THE DISCLOSURE

A network device may be a device (e.g., a computing device, an electronic device etc.) capable of communicating data with other devices through a wired or wireless connection or set of connections. For example, a network device may receive data from a first device (e.g., a first computing device, a first switch, a first router, etc.) and may forward the data to a second device (e.g., a first computing device, a first switch, a first router, etc.). During the operation of the network device, the network device may reboot (e.g., reset, turn off and on, power cycle, reload, etc.) for various reasons. For example, the network device may reboot due to a software upgrade, a power loss, etc.

SUMMARY OF THE DESCRIPTION

In some implementations, a method is provided. The method includes determining that a network device will perform a reboot. The method also includes saving state information. The state information comprises data used by the network device to process address resolution protocol (ARP) messages. The method further includes initiating the reboot of the network device. The method further includes initiating a first ARP service. The first ARP service is configured to process ARP messages during the reboot of the network device.

In some implementation, a network device is provided. The network device includes a memory and a processing device coupled to the memory. The processing device configured to determine that a network device will perform a reboot. The processing device is further configured to save state information. The state information comprises data used by the network device to process address resolution protocol (ARP) messages. The processing devices is further configured to initiate the reboot of the network device. The processing device is further configured to initiate a first ARP service. The first ARP service is configured to process ARP messages during the reboot of the network device.

In some implementations, a non-transitory machine-readable medium having executable instructions to cause a processing device of a network device to perform a method, is provided. The method includes determining that the network device will perform a reboot. The method also includes saving state information. The state information comprises data used by the network device to process address resolution protocol (ARP) messages. The method further includes initiating the reboot of the network device. The method further includes initiating a first ARP service. The first ARP service is configured to process ARP messages during the reboot of the network device.

In some implementations, a method is provided. The method includes determining that a network device will perform a reboot. The network device comprises a set of network interfaces that are part of a link aggregation group. The method further includes saving state information, wherein the state information comprises data used by the network device to process link aggregation control protocol (LACP) messages. The method further includes initiating the reboot of the network device. The method further includes initiating a first LACP service. The first LACP service is configured to process LACP messages during the reboot of the network device.

In some implementations, a network device is provided. The network device includes a memory and a processing device coupled to the memory. The processing device is configured to determine that a network device will perform a reboot. The network device comprises a set of network interfaces that are part of a link aggregation group. The processing device is further configured to save state information. The state information comprises data used by the network device to process link aggregation control protocol (LACP) messages. The processing device is further configured to initiate the reboot of the network device. The processing device is further configured to initiate a first LACP service. The first LACP service is configured to process LACP messages during the reboot of the network device.

In some implementations, a non-transitory machine-readable medium having executable instructions to cause a processing device of a network device to perform a method is provided. The method includes determining that a network device will perform a reboot. The network device comprises a set of network interfaces that are part of a link aggregation group. The method also includes saving state information. The state information comprises data used by the network device to process link aggregation control protocol (LACP) messages. The method further includes initiating the reboot of the network device. The method further includes initiating a first LACP service. The first LACP service is configured to process LACP messages during the reboot of the network device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The present disclosure is illustrated by way of example and not limitation in the figures of the accompanying drawings in which like references indicate similar elements.

FIG. 5A is a diagram illustrating an example network architecture, in accordance with some embodiments of the present disclosure.

DETAILED DESCRIPTION

As discussed above, a network device may be a device (e.g., a computing device, an electronic device, etc.) that may communicate data with other devices (e.g., may receive data from a first device and may forward the data to a second device. During the operation of the network device, the network device may reboot (e.g., reset, turn off and on, power cycle, reload, etc.) for various reasons. For example, the network device may reboot due to a software upgrade, a power loss, etc.

The network device may be unable to process messages, packets, etc., when the network device is rebooting. For example, the network device may not be able to receive an address resolution protocol (ARP) request and may not be able to transmit an ARP response to the ARP request, while the network device is rebooting. In another example, the network device may be unable to process to link aggregation control protocol (LACP) messages while the network device is rebooting (e.g., may be able to transmit LACP keep-alive messages while the network device is rebooting). Because the network device is not able to process packets while the network device is rebooting, this cause other network devices to stop communicating with the network device (e.g., to be able to transmit packets to the network device, to stop using network interfaces of the network device in a ling aggregation group, etc.).

Figure 1:
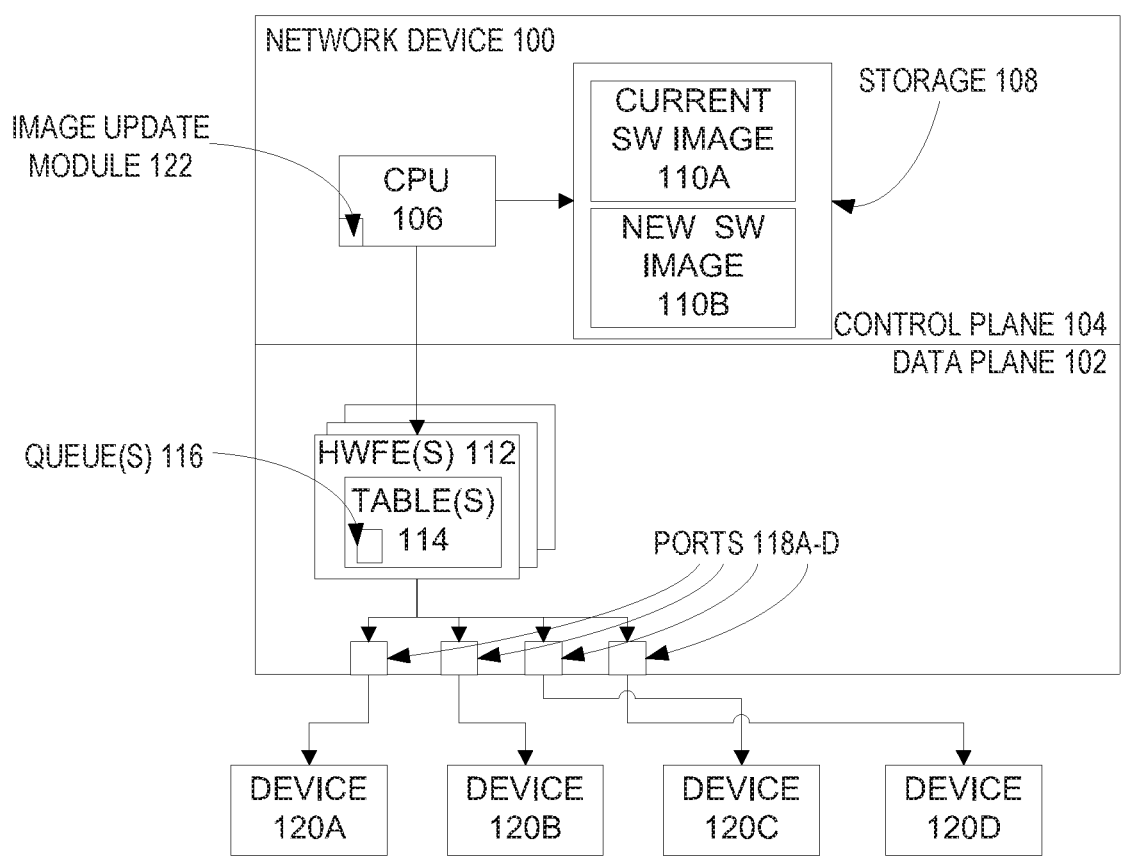
FIG. 1 is a block diagram of one embodiment of a network device that includes multiple software images.

FIG. 1 is a block diagram of one embodiment of a network device 100 that includes multiple software images 110A-B. In FIG. 1, the network device 100 includes a data plane 102 and a control plane 104. In one embodiment, the data plane 102 receives, processes, and forwards network data using various configuration data (e.g., forwarding, security, quality of service (QoS), and other network traffic processing information). For example, for each received packet of the network data, the data plane determines a destination address of that packet, looks up the requisite information for that destination in one or more tables stored in the data plane, and forwards the packet out the proper outgoing interface. The data plane 102 includes one or more hardware forwarding engines 112 that can each receive, process, and/or forward network traffic. In one embodiment, each hardware forwarding engine 112 includes one or more hardware tables 114. In one embodiment, the hardware tables 114 store configuration data, monitoring data, reporting data, and/or other management data for the hardware forwarding engine 112. The hardware table(s) 114 are further described below.

In one embodiment, the control plane 104 gathers the management data from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and writes this configuration data to hardware table(s) 114. In one embodiment, the control plane 104 includes a central processing unit (CPU) 106 and storage 108. In one embodiment, the CPU 106 is a CPU that is used to control the processing functions of the network device 100. For example and in one embodiment, the active CPU 106 controls the configuration of the hardware forwarding engine(s) 112, retrieves the stored monitoring data, retrieves stored statistics, and/or performs other control functions. In one embodiment, the CPU 106 updates the software image for the network device 100. In this embodiment, storage 108 includes two software images 110A-B, which are a current software image 110A and a new software image 110B. In one embodiment, the current software image 110A is the software image that the network device 100 is currently running. In this embodiment, the new software image 110B is the same or a different software image than the current software image 110A. For example and in one embodiment, the new software image 110B can be a new version of the software image, a downgrade to an older software image version, or a reinstall of the current software image 110A. In one embodiment, an upgrade to a new software image can be used to add new features and/or bugs fixes for the current software image 110A. In another embodiment, a downgrade to an older software image version can be used to install a more stable software image. In a further embodiment, the software image update can be a re-install of a current software image 110A, which can be used in case the current software image 110A becomes corrupted. In one embodiment, the CPU 106 includes an update image module 122 that is used to update the network device 100 with the new software image 110B from the current software image 110A.

In one embodiment, the data plane 102 includes ports 118A-D. In this embodiment, the hardware forwarding engine(s) 112 are coupled to one or more of the ports 118A-D. In one embodiment, each of the ports 118A-D is used by the network device 100 to communicate network data with devices 120A-D. In one embodiment, device 120A-D is any type of device that can communicate network data with another device (e.g., a personal computer, laptop, server, mobile device (e.g., phone, smartphone, personal gaming device, etc.), another network device, etc.). In one embodiment, the devices 106A-B can be a virtual machine or can be a device that hosts one or more virtual machines. In another embodiment, the network device can be a virtual machine.

In one embodiment, the hardware table 114 is used to configure the hardware forwarding engine(s) 112. In one embodiment, the hardware table 114 is used to store configuration data, monitoring data, reporting data, statistics, and any other data the hardware forwarding engine uses or collects. In one embodiment, the hardware table 114 can include tables such as a routing table, MAC table, ACL, and/or other tables. For example and in one embodiment, the routing table stores running table entries for the one or more routing protocols that is used by the hardware forwarding engine, by using any of the running protocols known in the art such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol known in the art. The MAC table is a table of MAC addresses known to the hardware forwarding engine and ports that these MAC address are associated with. In one embodiment, the MAC table is used for layer 2 forwarding. In one embodiment, the ACL consists of an ordered series of rules, where each rule has a match criterion and action. In this embodiment, the ACL is applied to the network data against these rules in order, and the action of the first rule that matches is taken. In one embodiment, the other tables is a set of one or more tables that is used to store statistics, monitoring data, other configuration data, stored events, management data, and/or other data the hardware forwarding engine uses or collects.

Figure 2:
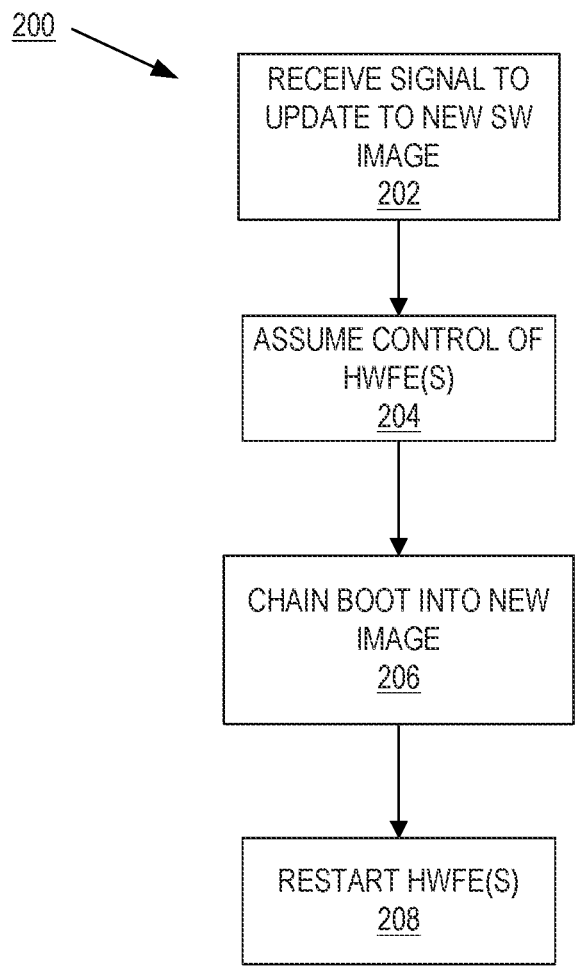
FIG. 2 is a flow diagram of one embodiment of a process to update a network device to a new software image.

FIG. 2 is a flow diagram of one embodiment of a process 200 to update a network device to a new software image. In one embodiment, process 200 is performed by an image update module to update the software image for a network device, such as image update module 122 of FIG. 1 above. In FIG. 2, process 200 begins by receiving a signal to update the network device to a new software image at block 202. In one embodiment, the new software image can be a new version of the software image, a downgrade to an older software image version, a reinstall of the current software image. In one embodiment, an upgrade to a new software image can be used to add new features and/or bugs fixes for current software image. In another embodiment, a downgrade to an older software image version can be used to install a more stable software image. In a further embodiment, the software image update can be a re-install of a current software image version, which can be used in case the running software image becomes corrupted. In one embodiment, the new software image is the image marked as current and the current software image is marked as the alternative software image.

At block 204, process 200 assumes control of the hardware forwarding engines. In one embodiment, once programmed by the software image and the associated hardware tables, the hardware forwarding engines can run in a "headless" mode, where the hardware forwarding engines process network data independently of the control plane. By assuming control of the hardware forwarding engines, process 200 can restart each of the hardware forwarding engines and rebuild the state of these hardware forwarding engines. Process 200 chain boots into the new software image at block 206. In one embodiment, chain booting is the process of loading another software image for the control plane while the network device is currently running and without restarting the control plane or network device. By chain booting the new software image, the control plane runs the new software image.

In one embodiment, chain booting the new software image allows the control plane to run the new software image without rebooting the network device. At this point, the data plane, including the hardware forwarding engines, is running the old software image. To get the data plane running the new software image, the hardware forwarding engines are restarted so that these engines use the new software configuration. At block 208, process 200 restarts the hardware forwarding engines. In one embodiment, process 200 restarts the hardware forwarding engine in unison, one-by-one, and/or in groups of one or more hardware forwarding engines. In one embodiment, restarting the hardware forwarding engines rebuilds the states for each hardware forwarding engine. In addition, by restarting, each hardware forwarding engine is programmed to use the instructions from the new software image as well as programming the data plane to be running with the new software image. In one embodiment, process 200 can take about 30 seconds to update the network device to the new software image, which is much less than simply rebooting the entire network device as described above. Thus, in one embodiment, process 200 reduces the interruption of the network data processing to about half a minute. This will reduce the scope of the network interruption for this network device and the network services that rely on the network device.

In FIG. 2, process 200 reduced the scope of network service interruption down to about 30 seconds. In addition, the network device did not experience a reboot. However, even a short disruption can cause network services to stop working. In one embodiment, a network service may use keep-alive messages between nodes using the service to determine that the link and/or other service resources are up and functioning normally. In one embodiment, a keep-alive message is a message sent by one device to another device to check that the service between the two devices is operating. The network service may require that these keep-alive messages be communicated on a short time frame, such as a few seconds. For example and in one embodiment, the network service using Link Aggregation Control Protocol (LACP) utilizes keep-alive messages between devices using this protocol on the order of seconds. In this embodiment, even an interruption of 30 seconds or less can disrupt this service. In one embodiment, prior to updating the software image of the network device, the network device can prefill the queues of the hardware forwarding engines with the keep-alive messages for protocols or network services that communicate keep-alive messages on a short time frame. In this embodiment, the network device creates the messages and inserts them in a queue so that these messages are transmitted on the correct schedule as if the network device did not experience a service disruption.

Figure 3:
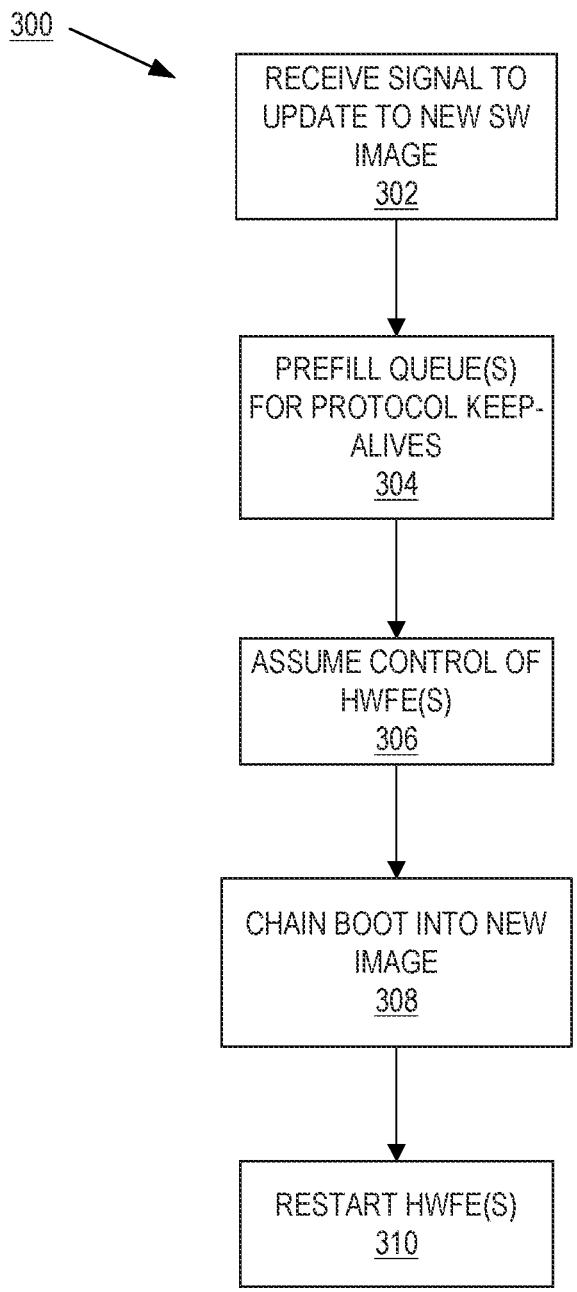
FIG. 3 is a flow diagram of one embodiment of a process to update a network device to a new software image by prefilling a queue with keep-alive messages.

In one embodiment, FIG. 3 is a flow diagram of one embodiment of a process 300 to update a network device to a new software image by prefilling a queue with keep-alive messages. In one embodiment, In FIG. 3, process 300 begins by receiving a signal to update the network device to a new software image at block 302. In one embodiment, the new software image can be a new version of the software image, a downgrade to an older software image version, a reinstall of the current software image as described in FIG. 2, block 202 above. In one embodiment, the new software image is the image marked as current and the current software image is marked as the alternative image.

At block 304, process 300 prefills one or more queues with protocol keep-alive messages. In one embodiment, process 300 identifies the protocol or network services running on the network device that use short interval keep-alive messages (e.g., LACP). Alternatively, process 300 identifies a network service or protocol that is scheduled to send and/or respond to a keep-alive message during the time that the data processing functions will be unavailable. For each identified protocol or network service, process 300 determines the number of keep-alive message that would be transmitted in the time that the network device would have disrupted service (e.g., 30 seconds). For example and in one embodiment, if a network service sends a keep-alive message every five seconds, process 300 would generate 6-7 keep-alive messages. With these messages, process 300 prefills a transmission queue in the hardware forwarding engines. In one embodiment, process 300 prefills a transmission queue in the in the hardware forwarding engines that corresponds to a port that will transmit the keep-alive messages. By prefilling the queue(s) with the keep-alive messages and subsequently transmitting them on a predetermined schedule, the network device will appear as running normally during the software image update for these protocols. In one embodiment, prefilling the queues means that process 300 adds the keep-alive messages prior to these messages being transmitted and configures the keep-alive messages and/or the queue to be transmitted at the appropriate time. In one embodiment, process 300 tags each keep-alive message with the appropriate tags so that these messages are transmitted at the appropriate time. In another embodiment, process 300 configures the queue to transmit these messages at the appropriate time. For example and in one embodiment, assume a network service sends a keep-alive messages every five seconds. In this embodiment, process 300 prefills a queue with 6-7 messages and configures the messages and/or the queue to transmit those messages every five seconds. In one embodiment, the keep-alive messages could be a message that is sent to initiate the keep-alive process or can be a message that is sent in response to an anticipated keep-alive message.

At block 306, process 300 assumes control of the hardware forwarding engines as described in FIG. 2, block 204 above. By assuming control of the hardware forwarding engines, process 300 can restart each of the hardware forwarding engines and rebuild the state of these hardware forwarding engines. Process 300 chain boots into the new software image at block 308. In one embodiment, chain booting is the process of loading another software image for the control plane while the network device is currently running and without restarting the control plane. By chain booting the new software image, the control plane runs the new software image.

In one embodiment, chain booting the new software image allows the control plane to run the new software image without rebooting the network device. At this point, the data plane, including the hardware forwarding engines, is running the old software image. To get the data plane running the new software image, the control plane is restarted to use the new software image. At block 310, process 300 restarts the hardware forwarding engines. In one embodiment, process 300 restarts the hardware forwarding engine in unison, one-by-one, and/or in groups of one or more hardware forwarding engines. In one embodiment, restarting the hardware forwarding engines rebuilds the states for each hardware forwarding engine as described in FIG. 2, block 208 above. Similar as described in FIG. 2 above, process 300 can take about 30 seconds to update the running software image, which is much less than simply rebooting the network device as described above. Thus, in one embodiment, process 300 reduces the interruption of the network data processing to about half a minute. In addition, by prefilling one or more queues with keep-alive messages, one or more network services or protocols may not experience a service interruption. This will reduce the scope of the network interruption for this network device and the network services that rely on the network device.

Figure 4:
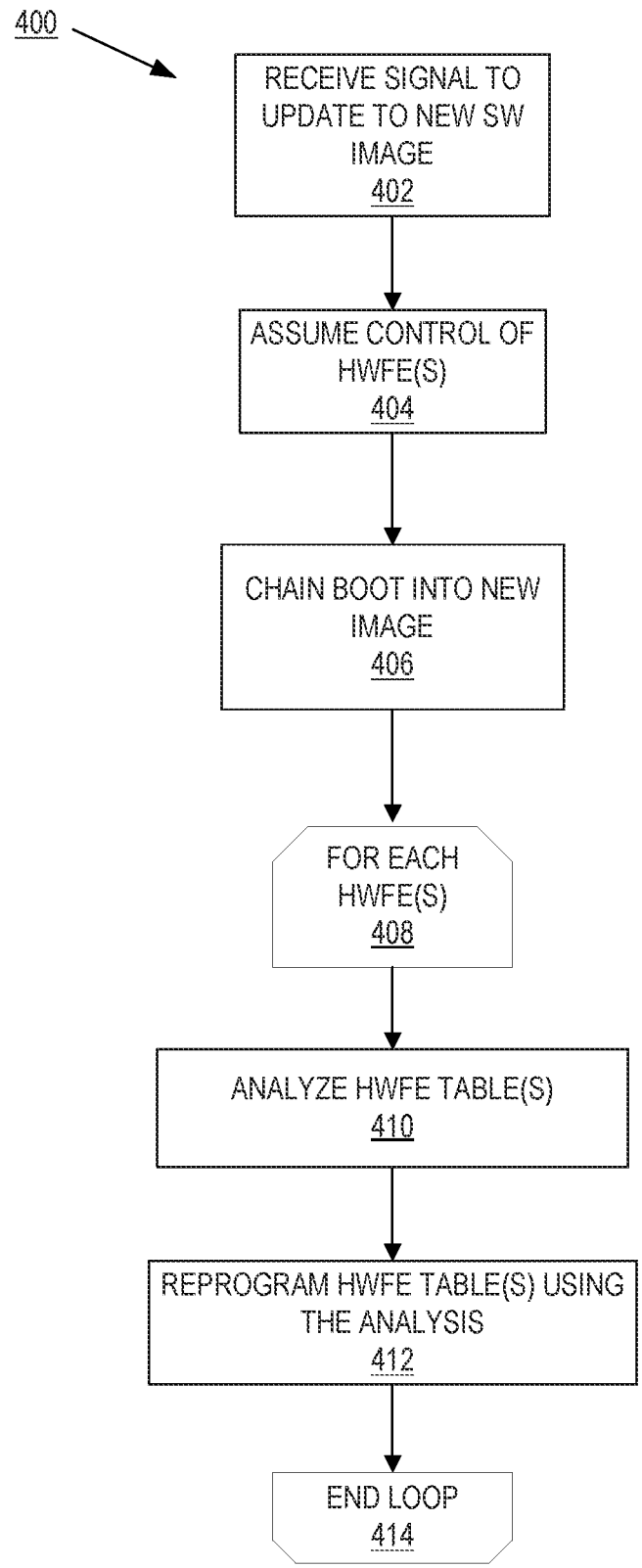
FIG. 4 is a flow diagram of one embodiment of a process to update a network device to a new software image by reprogramming the tables of the hardware forwarding engines.

As described above in FIGS. 2 and 3, these processes reduce the amount of time that the network device is unavailable down to about 30 seconds for some or all of the data processing functions of the network device. In another embodiment, the network device can update the software image of this network device without restarting the hardware forwarding engines. In one embodiment, instead of restarting the hardware forwarding engines as described above in FIGS. 2 and 3, the network device analyzes each of the hardware tables for each of the hardware forwarding engines and re-programs these hardware tables so that these hardware tables can be used with the new software image. FIG. 4 is a flow diagram of one embodiment of a process 400 to update a network device to a new software image by re-programming the tables of the hardware forwarding engines. In one embodiment, process 400 is performed by an image update module to update the software image for a network device, such as image update module 122 of FIG. 1 above. In FIG. 4, process 400 begins by receiving a signal to update the network device to a new software image at block 402. In one embodiment, the new software image can be a new version of the software image, a downgrade to an older software image version, a reinstall of the current software image as described in FIG. 2, block 202 above. In one embodiment, the new software image is the image marked as current and the current software image is marked as the alternative software image.

At block 404, process 400 assumes control of the hardware forwarding engines. In one embodiment, once programmed by the software image and the associated hardware tables, the hardware forwarding engines can run in a "headless" mode, where the hardware forwarding engines process network data independently of the control plane. In this embodiment, the process 400 assumes control of the hardware forwarding engines as described above in FIG. 2, block 204. By assuming control of the hardware forwarding engines, process 400 can analyze and re-program the hardware table for the hardware forwarding engines. Process 400 chain boots into the new software image at block 406. In one embodiment, chain booting is the process of loading another software image for the control plane while the network device is currently running. By chain booting the new software image, the control plane runs the new software image.

In one embodiment, chain booting the new software image allows the control plane to run the new software image without rebooting the network device. At this point, the hardware forwarding engines, is running the old software configuration. To get the hardware forwarding engines running the new software configuration, process 400 analyzes and re-programs each of the hardware tables for each of the hardware forwarding engines. In one embodiment, process 400 performs a processing loop (blocks 408-414) to update the hardware forwarding engines by analyzing and re-programming the hardware tables for each of the hardware forwarding engines. At block 410, process 400 analyzes each of the hardware tables for structure and content. In one embodiment, process 400 determines the order of the routing tables because each hardware table can be indeterminate. In one embodiment, this means that each of the hardware tables can have a random order. In this embodiment, the updating proceeds in the order of that table so that the table remains consistent while being used. For example and in one embodiment, for a routing table, process 400 determines the order of entries in a routing table. In this embodiment, if the routing table has entries 1, 2, 3, 4, 5 for the network addresses A, B, C, D, E, respectively, process 400 determines this order and uses this order when re-programming this routing table.

At block 412, process 400 re-programs each of the hardware table(s) using the analysis from block 410. In one embodiment, process 400 uses the structure and content determined in block 410 to re-program a hardware table. For example and in one embodiment, in the routing table example given above, process 400 would re-program this routing in the order and content of the current routing table. In this example, process 400 would re-program the routing table entry 1 for network address A, routing table entry 2 for network address B, routing table entry 3 for network address C, routing table entry 4 for network address D, and routing table entry 5 for network address E. In one embodiment, process 400 could program the entries in the order of 1-5, 5-1, or another order, so long that each routing table entry is being programmed with the corresponding content. In one embodiment, if process 400 does not program the table using the correct order and content, it is possible for the table have a different state in the middle of the update. For example and in one embodiment, if process 400 updates the routing table entry 1 with network address B, the resulting routing table would have network addresses B, B, C, D, E in entries 1-5. This intermediate state of the table would be different than the original table. Accordingly, a corresponding hardware forwarding engine may have different behavior when using intermediate state of the table. By programming the table in the correct order and using the correct structure and content, the hardware forwarding engine will have the same behavior during the re-programming of this table.

FIG. 5A is a diagram illustrating an example network architecture 500, in accordance with some embodiments of the present disclosure. The network architecture includes network devices 510 and network 505. As discussed above, network devices 510 may be devices that may communicate network data (e.g., messages, packets, frames, etc.) with another device. For example the first (e.g. leftmost) network device 510 may be a switch, router, hub, bridge, gateway, etc., that receive data from the second (e.g., rightmost) network device 510 and may forward the data to another device, and vice versa. In other embodiments, each of the network devices 510 may be a virtual machine, a container and/or a device that hosts one or more virtual machines or containers.

Network 505 may be a public network (e.g., the internet), a private network (e.g., a local area network (LAN) or wide area network (WAN)), or a combination thereof. In one embodiment, network 505 may include a wired or a wireless infrastructure, which may be provided by one or more wired or wireless communications systems, such as a wireless fidelity (WiFi) hotspot connected with the network 505 and/or a wireless carrier system that can be implemented using various data processing equipment, communication towers (e.g. cell towers), etc. The network 505 may carry communications (e.g., data, message, packets, frames, etc.) between the network devices 510.

Each network device 510 includes a control plane 520 and a data plane 540. As discussed above, the control plane 520 may control these processing functions of the data plane 540 by configuring the data plane 540, managing data collected by the data plane 540, monitoring the data plane 540, and other management functions. As discussed above, the data plane 540 may receive, process, and/or forward network data using various configuration data (e.g., forwarding, security, quality of service (QoS), and other network traffic processing information).

The control plane 520 includes a processing device 530. The processing device 530 may be a processor (e.g., a multi-core processor), a field programmable gate array (FGPA), an application specific integrated circuit (ASIC), a controller, or other type of device that may be capable of executing instructions (e.g., machine code, software instructions, etc.). The processing device 530 may include a software image 531. For example, the processing device 530 may execute the software image 531 to perform various tasks, actions, functions, operations, methods, etc. The software image 531 includes services 532A through 532Z. The services 532A through 532Z may be executed by the processing device 530 to perform different tasks, actions, functions, operations, methods. For example, service 532A may be a service that monitors the temperatures of components in the network device 510. The services 532A through 532Z may also be referred to as agents, processes, threads, etc.

In one embodiment, the network device 510 may implement and/or use the address resolution protocol (ARP). ARP may be a communication protocol that allows devices (e.g., network devices, computing devices, etc.) to determine a link layer address that is associated with an internet layer address. A link layer address may also be referred to as a layer 2 (L2) address. A medium access control (MAC) address may be an example of a link layer address (e.g., an example of a L2 address). An internet layer address may be referred to as a layer 3 (L3) address. An internet protocol (IP) address may be an example of an internet layer address (e.g., an example of a L3 address). A left most network device 510 may send an ARP request to obtain the link layer address associated with an internet layer address of a network interface on the rightmost network device 510 so that the first network device may address messages, packets, etc., to the network interface on the rightmost network device 510. The rightmost network device 510 may send an ARP response when the rightmost network device 510 receives the ARP request. The ARP response may include the link layer address associated with the internet layer address indicated in the ARP request.

As illustrated in FIG. 5A, the software image 531 includes an ARP service 533. The ARP service 533 may be a standard, general, normal, etc. service that processes ARP messages during the normal operation of the network device 510. For example, the ARP service 533 may process ARP messages when the network device 510 is not rebooting or has completed a reboot.

In one embodiment, the network device 510 may be rebooted (e.g., reset, power cycled, turned off and on, etc.) for various reasons. For example, the network device may reboot due to a software upgrade/update to update the software image 531. The software upgrade/update may update the software image 531 from a current version to a new or updated version. In another example, a user (e.g., a network administrator) may provide a command to the network device 510 to reboot the network device 510 (e.g., enter a command via a command line interface (CLI), transmit a message/command to the network device 510, etc.). During the reboot of the network device 510, the network device may operate as described above in FIGS. 1-4. For example, the network device 910 may perform a chain boot of the control plane 520.

As discussed above, the ARP service 533 may be part of the software image that is used to boot and/or operate the network device 510. During the reboot of the network device, 510 the ARP service 533 may not be executing (e.g., may not be operating, may not be initiated or started, etc.) until a certain point in the reboot process and/or until after the network device 510 has completed the reboot. Because the ARP service 533 may not be executing for a period of time while the network device 510 reboots, the network device 510 may be unable to process ARP messages (e.g., ARP requests). For example, rightmost network device 510 may transmit an ARP request to the leftmost network device 510. The ARP request may be a request for the link layer address (e.g., a MAC address) associated with an internet layer address (e.g., an IP address) for a network interface of the network device 510. The ARP request may also have a timeout period (e.g., 30 seconds, 45 seconds, or some other appropriate period of time) before the rightmost network device 510 determines that no response was received to the ARP request. Because the leftmost network device 510 may be rebooting, the leftmost network device 510 may be unable to respond to the ARP request (with an ARP response) before a timeout period for the ARP request expires. When the ARP request from the rightmost network device 510 times out, the rightmost network device 510 may be unable to transmit data to the leftmost network device 510 because the rightmost network device 510 may be unable to obtain a link layer address associated with the internet layer address for a network interface of the network device 510.

Figure 5B:
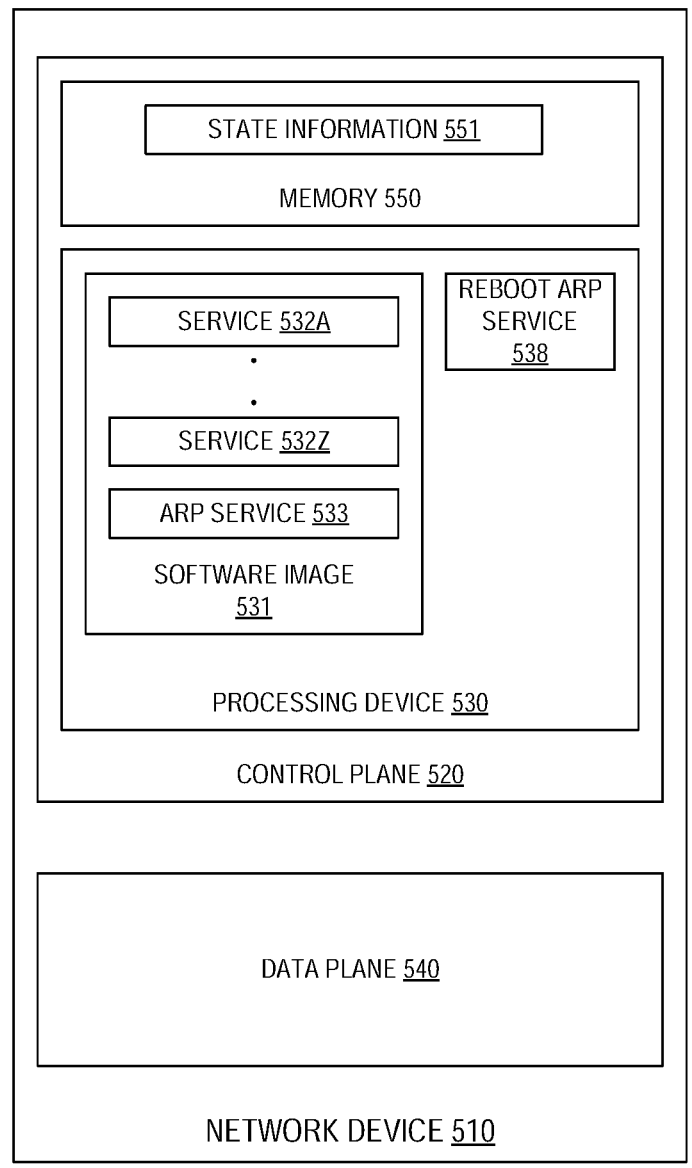
FIG. 5B is a diagram illustrating an example network device, in accordance with some embodiments of the present disclosure.

FIG. 5B is a diagram illustrating an example network device 510, in accordance with some embodiments of the present disclosure. As discussed above, network device 510 may be a device that may communicate network data (e.g., messages, packets, frames, etc.) with another device (e.g., a switch, router, hub, bridge, gateway, etc.). In other embodiments, each of the network devices 510 may be a virtual machine, a container and/or a device that hosts one or more virtual machines or containers. The network device 510 includes a control plane 520 and a data plane 540. The control plane 520 includes a processing device 530. The processing device 530 may include a software image 531. The software image 531 includes services 532A through 532Z and ARP service 533. The network device 510 may implement and/or use the address resolution protocol (ARP). For example, the network device 510 may receive an ARP request and may transmit an ARP response, or vice versa.

In one embodiment, the processing device 530 may determine that the network device 510 will perform a reboot. For example, the processing device 530 may determine that the network device 510 receive a signal, message, request, command, etc., to update the software image 531 of the network device 510 to a new software image. The network device 510 may receive the signal, message, request, command, etc., via a command line interface (CLI), a graphical user interface, etc. The network device 510 may also receive the signal, message, request, command, etc., via a network interface (e.g., a port) of the network device 510 (e.g., may receive a message from a remote server or other computing device). The network device 510 may be rebooted to update, upgrade, etc., the software image 531 (e.g., a current software image) of the network device 531 to the new software image. For example, the network device 510 may be rebooted so that the new software image may take affect (e.g., so that the network device 510 loads the new software image into a memory and executes the new software image). In one embodiment, the new software image may be a different version of the current software image. For example, the new software image may be an updated or newer version of the current software image.

In one embodiment, the processing device 530 may store or save state information that may be used by the network device 510 to process ARP messages. For example, the processing device 530 may store, write, save, etc., the state information in a memory. The memory may be a persistent memory (e.g., a memory that retains data after data is no longer provided to the memory). Examples of a memory may include, but is not limited to, a hard disk drive, flash memory, solid state memory, etc. The state information may include data (e.g., text, numbers, alphanumeric values, lists, tables, or data in various formats) that may allow the network device 510 (e.g., allow the processing device 530 and/or the reboot ARP service 538) to process ARP messages during the reboot of the network device 510 (e.g., to continue processing ARP messages while the network device 510 is still completing a reboot). The processing device 530 may save the state information before the network device 510 is rebooted. For example, when the processing device 530 receives the signal, command, message, etc., to update the software image 531, the processing device 530 may save the state information to prepare for the reboot of the network device 510. In one embodiment, one of the processes 532A through 533Z and/or the ARP service 533 may save the state information. For example, when a command is receive to reboot the network device 510 and/or update the software image 531 of the network device 510, one of the processes 532A through 533Z and/or the ARP service 533 may automatically save the state information.

The state information may include a list of network interfaces, a list of identifiers for the network interfaces, a list of network addresses (e.g., IP addresses for the network interfaces), a mapping of network address to network interfaces (e.g., a mapping indicating which network interface has which network address), a mapping of link layer addresses (e.g., MAC addresses) to network addresses (e.g., a mapping that indicates which link layer address is associated with which network address). In one embodiment, the state information may be stored in a JavaScript Object Notation (JSON) format. For example, the state information may be stored in a JSON file. Although the present disclosure may refer to JSON formats and/or JSON files, other data formats may be used in other embodiments. For example, the state information may be stored in a comma separate value (CSV) file or format. In another example, the state information may be stored in an extensible markup language (XML) file or format.

In one embodiment, the processing device 530 may initiate the reboot of the network device. For example, the processing device 530 may obtain a new software image (e.g., may download the new software image, retrieve the new software image from a memory, etc. The processing device 530 may begin stop or terminate services (e.g., agents, processes, etc.), deallocate memory, save data, etc., in preparation of the reboot. After the processing device 530 initiates the reboot, the network device 510 may reboot (e.g., may restart, may reset, may power cycle, etc.).

In one embodiment, the processing device 530 may initiate the reboot ARP service 538 during the reboot of the network device 510. For example, before the reboot of the network device 510 has completed, the processing device 530 may initiate the reboot ARP service 538. The processing device 530 may imitate the reboot ARP service 538 by instantiating the reboot ARP service 538, beginning execution of the reboot ARP service 538, etc.

In one embodiment ARP service 538 may be initiated early in the reboot process. For example, the ARP service 538 may be one of the first few services that are initiated by the processing device 530 after the network device 510 reboots. The reboot ARP service 538 may be initiated before the services 532A through 532Z and ARP service 533 are initiated.

In one embodiment, the reboot ARP service 538 may be configured to process ARP messages for the network device 530 during the reboot of the network device 530. For example, the reboot ARP service 538 may process ARP messages received by the network device 530 before the network device 530 completes the reboot. Thus, the reboot ARP service 538 may allow the network device 530 to continue processing ARP messages while the network device 530 is still rebooting.

In one embodiment, the reboot ARP service 538 may configure one or more network interfaces of the network device based on the state information (e.g., the state information that was saved prior to imitating the reboot of the network device 510) when the reboot ARP service 538 is initiated. For example, the reboot ARP service 538 may assign internet layer addresses (e.g., IP addresses) to the network interfaces of the network device 510. The reboot ARP service 538 may assign the internet layer addresses based on the mapping of link layer addresses (e.g., MAC addresses) to internet layer address that indicated in the state information. In another example, the reboot ARP service 538 may also assign identifiers to the network interfaces (e.g., names, identifier values, etc.) for the network interfaces. In a further example, the reboot ARP service 538 may configure types for the network interfaces (e.g., whether the network interface is a switch virtual interface, a routed port, etc.

In one embodiment, the reboot ARP service 538 may configure one or more of a memory, a direct memory access channel, or a data queue based on the state information (e.g., the state information that was saved prior to imitating the reboot of the network device 510) when the reboot ARP service 538 is initiated. For example, state information may include a list of ARP requests that the network device 510 was not able to process (e.g., respond to) before the network device 510 was rebooted. The reboot ARP service 538 may configure a memory or a portion of memory for use. The reboot ARP service 538 may allocate a data queue (e.g., an ingress queue) to store the ARP requests so that the reboot ARP service 538 may process the ARP requests. The reboot ARP service 538 may also configure one or more direct memory access channels to allow the processing device 530 to access the memory (and/or different portions of the memory). The reboot ARP service 538 may further allocate additional queues (e.g., ingress queues, sets of ingress and egress queues for different network interfaces, etc.), based on the state information. For example, the reboot ARP service 538 may allocate an ingress queue (to store incoming or received messages/packets) and an egress queue (to store outgoing packets or packets to be transmitted) for each network interface indicated or listed in the state information.

In one embodiment, the reboot ARP service 538 may configure the network interfaces, one or more memories, one or more direct access channels, one or more data queues, etc., such that the network interfaces, one or more memories, one or more direct access channels, one or more data queues are ready for the network device 510 to use once the network device 510 is rebooted. For example, once the network device 510 is rebooted using a new software image the services 532A through 532Z and/or the ARP service 533 may be able to use the network interfaces, one or more memories, one or more direct access channels, and/or one or more data queues without having to first configure them because they were already configured by the reboot ARP service 538.

In one embodiment the reboot ARP service 538 may process ARP messages by receiving ARP requests. For example, the reboot ARP service 538 may receive an ARP request for a link layer address associated with the internet layer address of a network interface of the network device 510. The ARP request may be received while the network device 510 is still rebooting (e.g., before the network device 510 has completed rebooting). For example, the ARP request may be received before the network device 510 has rebooted and/or before the ARP service 533 has been initiated. The reboot ARP service 538 may further process ARP messages by responding to the ARP requests that were received while the network device 510 is still rebooting.

In one embodiment, the processing device 530 may determine whether the ARP service 533 has been initiated. For example, as the network device 510 finishes rebooting, the network device 510 may begin executing (e.g., may initiate) the services 532A through 532Z of the network device and the ARP service 533. The processing device 530 may determine whether the network device 510 has finished rebooting and/or whether execution of the ARP service 533 was initiated or started. If the ARP service 533 has not been initiated, the processing device 530 may allow the reboot ARP service 538 to continued processing ARP messages (e.g., to continue receiving ARP requests and/or transmitting ARP responses to the ARP requests). If the ARP service 533 has been initiated, the processing device 530 may use the ARP service 533 to process ARP messages. The ARP service 533 may be configured to process ARP messages after the network device 530 is rebooted and/or after the ARP service 533 has been initiated (e.g., after the ARP service 533 begins executing or starts). The processing device 530 may also stop the reboot ARP service 538 (e.g., may stop the execution of the Arp service 538). For example, the processing device 530 may terminate, stop, kill, close, pause, etc., the reboot ARP service 538. Thus, the processing of ARP messages may be performed by (e.g., handed off to) the ARP service 533 after the ARP service 533 is initiated or started. Because the ARP service 533 may take over the processing of ARP messages, the processing device 530 may no longer use the reboot ARP service 538 to process ARP messages so the reboot ARP service 538 may be terminated or stopped. In another embodiment, the reboot ARP service 538 may be a script that is executed by the processing device 530. The reboot ARP service 538 may be deleted or removed after the ARP service 533 has been initiated.

In one embodiment, the ARP service 538 and the LACP service 838 (illustrated in FIG. 8 and discussed in more detail below) may be combined into one service (e.g., a combined service) that process both ARP messages and LACP messages. For example, the ARP service 538 and the LACP service 838 into a single service (e.g., agent, process, etc.) that receives/processes ARP requests, transmits ARP responses, and transmit LACP keep-alive messages. The single service may be referred to as a reboot packet processing device, a fast packet transmit service, etc.

In one embodiment, the reboot ARP service 538 may be included in the software image 531. For example, the reboot ARP service 538 may be part of a current software image that is used by the network device 510. In another example, the reboot ARP service 538 may be include in a new software image (e.g., a new version of the software image 531) that will be used by the network device 510 after the network device 510 is rebooted. As the network device 510 loads, installs, updates, etc., the software image 351 to a new version of the software image, the ARP service 538 that may be in the new version of the software image, may be initiated by the processing device 530.

As discussed above, the network device 510 includes a control plane 520 and a data plane 540. In one embodiment, initiating a reboot of the network device 510 may cause the control plane 520 to reboot. For example, when the software image 531 is updated/upgraded to a new software image, the control plane 520 of the network device 510 may be rebooted to install the new software image. However, the data plane 540 may not be restarted, reset, rebooted, etc. For example, the control plane 520 may be rebooted without rebooting the data plane. In other embodiments, rebooting the network device 510 may cause both the control plane 520 and the data plane 540 to reboot.

In some embodiments, the reboot ARP service 538 may allow the network device 510 to start processing ARP messages more quickly after the network device 510 is rebooted. For example, because the reboot ARP service 538 is initiated shortly after the reboot of the network device 510 and before the services 532A through 532Z and the ARP service 933, the reboot ARP service 538 may be able to process ARP messages more quickly while the network device is loading the new software image. In addition, the reboot ARP service 538 may allow the network device 510 to process ARP messages (e.g., respond to ARP requests) before the timeout period for the ARP messages expires. For example, the reboot ARP service 538 may allow the network device 510 to respond to an ARP request before the timeout period for the ARP request expires.

Figure 6:
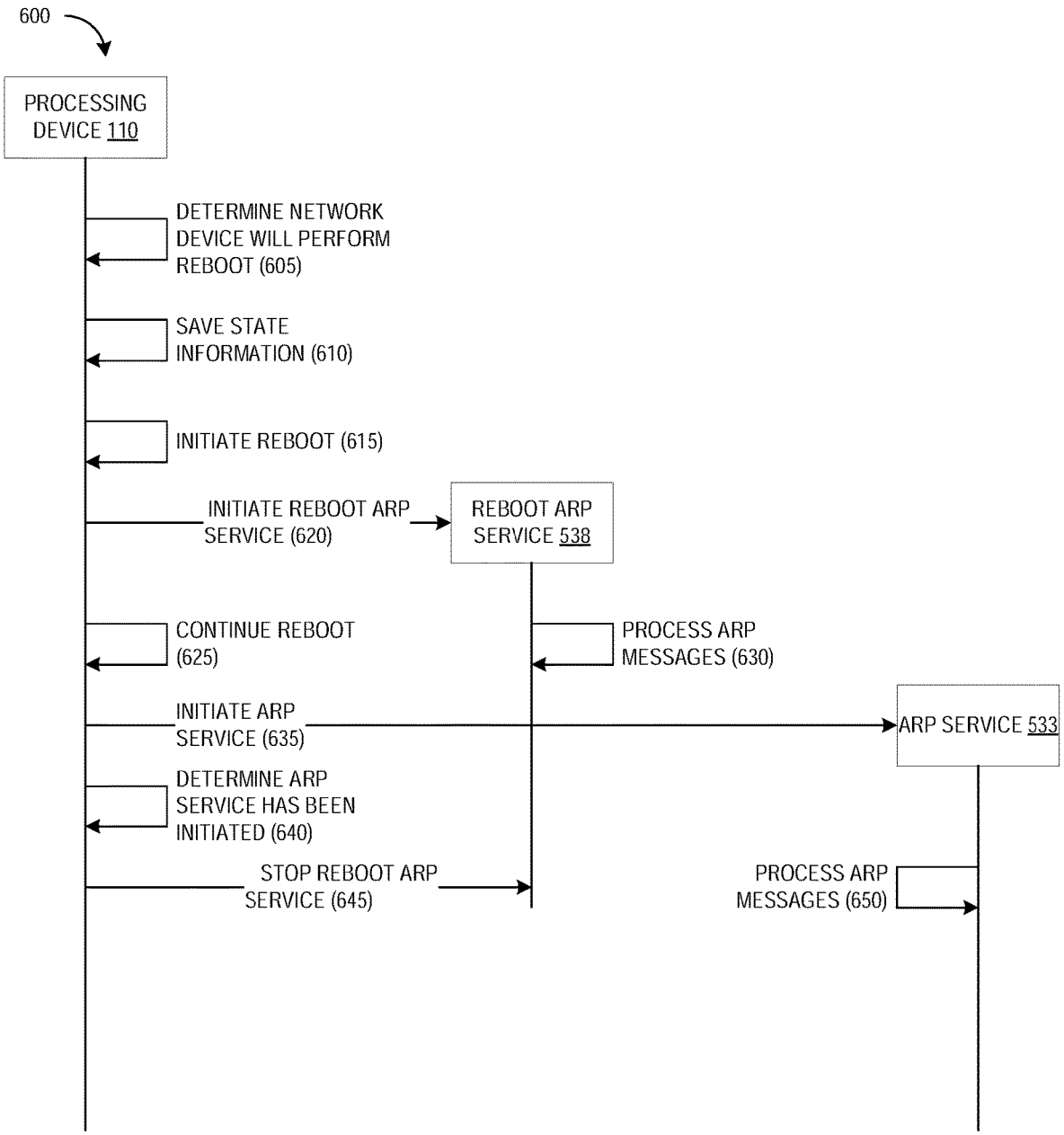
FIG. 6 is a sequence diagram 600 illustrating example actions that may be performed by a processing device and/or a network device, in accordance with one or more embodiments of the present disclosure.

FIG. 6 is a sequence diagram 600 illustrating example actions that may be performed by a processing device 530 and/or a network device (e.g., network device 510 as illustrated in FIG. 5B), in accordance with one or more embodiments of the present disclosure. The actions illustrated in the sequence diagram 600 may be performed as part of a reboot or reboot process for the network device 510. At block 605, the processing device may determine that the network device will perform a reboot. For example, the processing device 510 may determine that the network device will perform a reboot within a threshold period of time (e.g., within 15 seconds, within 25 seconds, or within some other appropriate period of time). In another example, the processing device 510 may determine that the network device will reboot due to a software image update. At block 610, the processing device 510 may save state information that may be used to process ARP messages. For example, the processing device 510 may save a list of network interfaces, names/identifiers for the network interfaces, network addresses (e.g., IP addresses) for the network interfaces, etc.

At block 615, the processing device 510 may initiate the reboot of the network device. For example, the processing device 510 may reboot a control plane of the network device. At block the processing device 510 may initiate a reboot ARP service 538. For example, the processing device 510 may begin executing the reboot ARP service 538. At block 625, the processing device 510 may continue rebooting the network device. At block 630, the reboot ARP service 538 may process ARP messages with the network device 510 continues to reboot. At block 635, the processing device may initiate the ARP service 533. The ARP service 533 may be the standard, general, normal, etc., ARP service that may process ARP services when the network device during standard or normal operation of the network device (e.g., when the network device is not rebooting). At block 640, the processing device 510 may determine that the ARP service 533 has been initiated. The processing device 510 may also determine that the network device has been rebooted (e.g., that the reboot is complete). At block 645, the processing device 510 may stop the reboot ARP service 538 (e.g., may terminate the reboot ARP service 538). At block 650, the ARP service 533 may process ARP messages (e.g., may take over the processing of ARP messages from the reboot ARP service 538).

Figure 7:
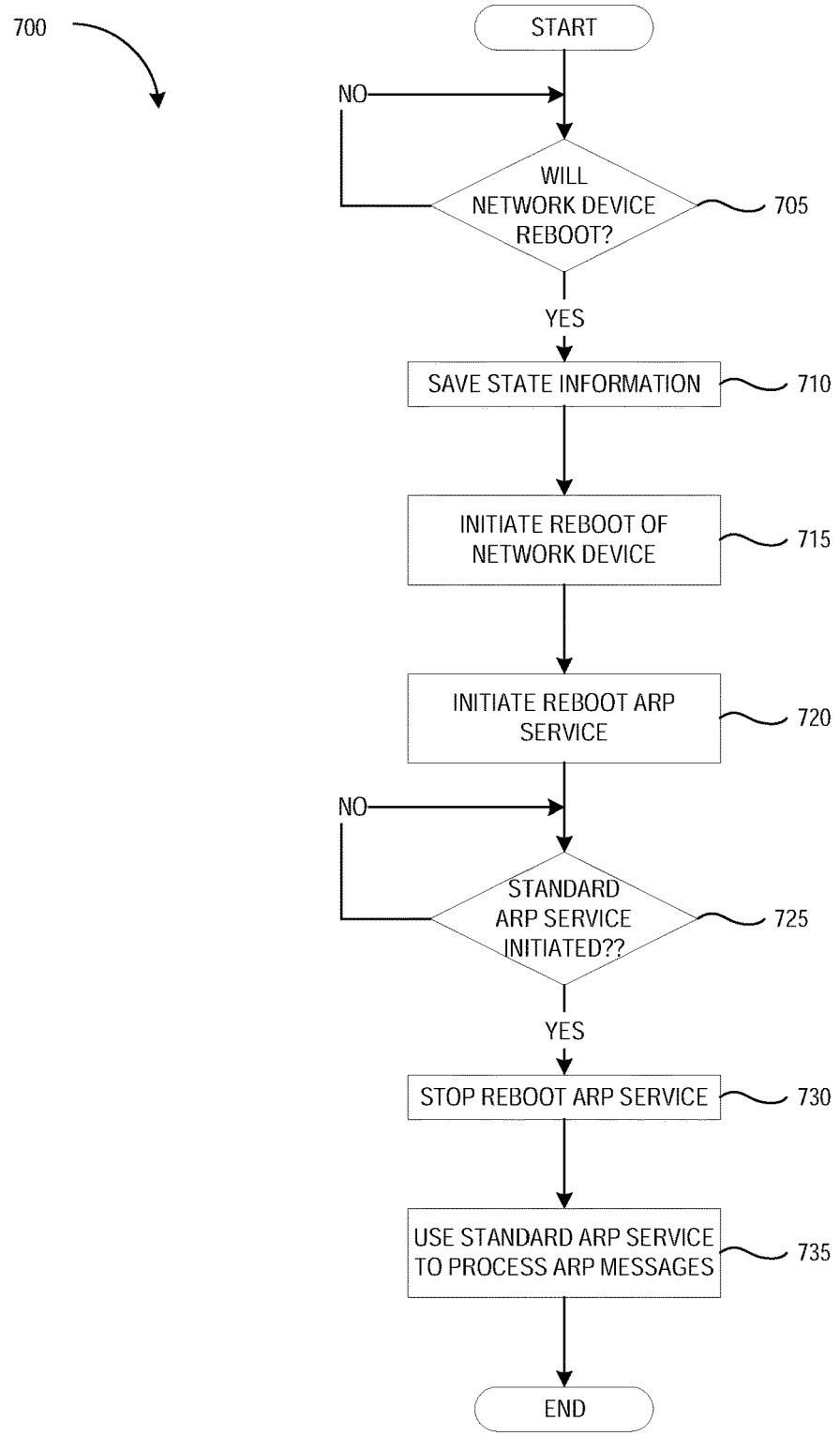
FIG. 7 is a flow diagram of a method of rebooting a network device, in accordance with some embodiments of the present disclosure.

FIG. 7 is a flow diagram of a method 700 of rebooting a network device, in accordance with some embodiments of the present disclosure. Method 700 may be performed by processing logic that may comprise hardware (e.g., circuitry, dedicated logic, programmable logic, a processor, a processing device, an ASIC, a FPGA, a central processing unit (CPU), a system-on-chip (SoC), etc.), software (e.g., instructions running/executing on a processing device), firmware (e.g., microcode), or a combination thereof. In some embodiments, the method 700 may be performed by a network device (e.g., network device 510 illustrated in FIG. 5B), and/or a processing device (e.g., processing device 530 illustrated in FIG. 5B). It should be appreciated that the actions of the method 700 in FIG. 7 can be performed in differing orders, groupings, or subsets than shown in FIG. 7, for various purposes or user preferences.

At block 700, the method 700 may determine whether the network device will perform a reboot (e.g., due to a software image upgrade/update). If the network device will not perform a reboot, the method 700 may proceed back to block 705. If the network device will perform a reboot, the method 700 may proceed to block 710 where the method 700 may store or save state information (e.g., a list of network interfaces, a list of network addresses, etc.). At block 715, the method 700 may initiate the reboot of the network device (e.g., reboot the control plane of the network device). At block 720, the method may initiate a reboot ARP service. The reboot ARP service may process ARP packets during the reboot of the network device. At block 725, the method 700 may continue with the reboot of the network device and may determine whether the standard ARP service (e.g., the ARP service that may be included in the new or update software image) has been initiated. If the standard ARP service has not been initiated, the method 700 may proceed back to block 725. If the standard ARP service has been initiated, the method 700 may proceed to block 730 where the method 700 stops the ARP reboot service. At block 735, the method 700 may use the standard ARP service to process ARP messages.

Figure 8:
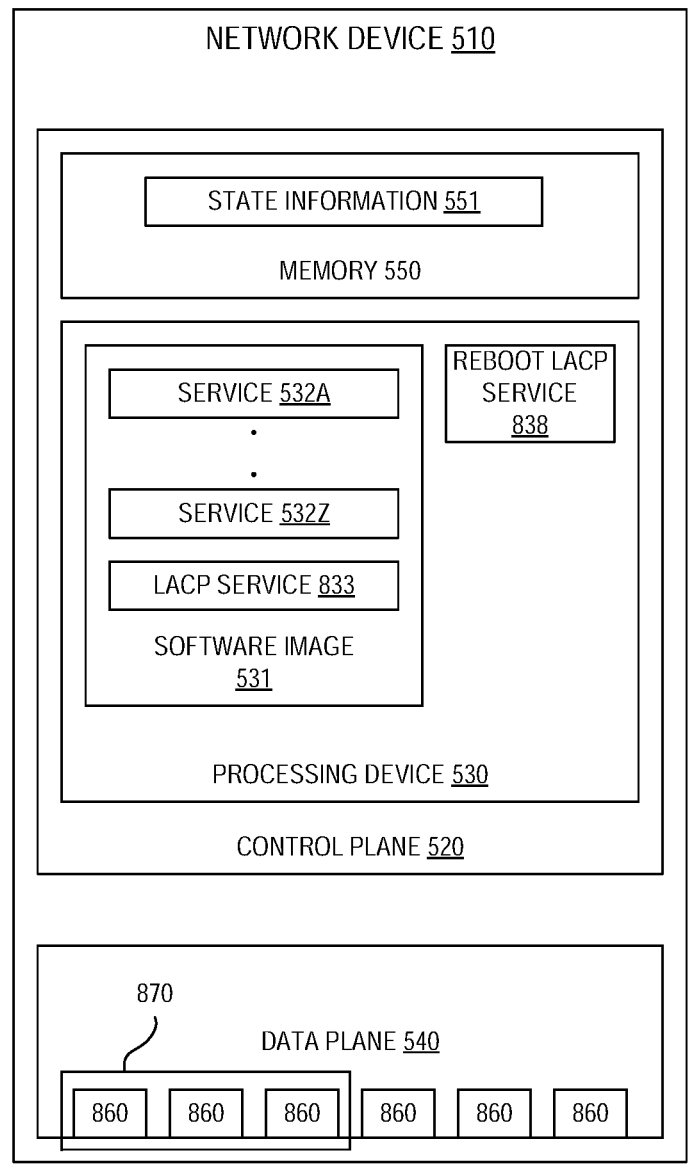
FIG. 8 is a diagram illustrating an example network device, in accordance with some embodiments of the present disclosure.

FIG. 8 is a diagram illustrating an example network device 510, in accordance with some embodiments of the present disclosure. As discussed above, network device 510 may be a device that may communicate network data (e.g., messages, packets, frames, etc.) with another device (e.g., a switch, router, hub, bridge, gateway, etc.). In other embodiments, each of the network devices 510 may be a virtual machine, a container and/or a device that hosts one or more virtual machines or containers. The network device 510 includes a control plane 520 and a data plane 540. The control plane 520 includes a processing device 530. The processing device 530 may include a software image 531. The software image 531 includes services 532A through 532Z and LACP service 533.

In one embodiment, the network device 510 may implement and/or use the link aggregation control protocol (LACP). The link aggregation control protocol may be a standard, protocol, functionality, etc., that allow multiple network interfaces (e.g., multiple physical ports) to be aggregated, grouped, bundled, organized, etc., to form a single logical communication channel. The LAG may be referred to as a link aggregation group (LAG). The LAG may have more bandwidth and/or throughput than a single one of the network interfaces. The LAG may also provide redundancy in case one of the network interfaces fails. For example, if one network interface in a LAG fails, the other network interfaces in the LAG may continue to transmit and/or receive data that was processed by the failed network interface. A LAG may allow a traffic load to be shared among different network interfaces in the LAG and may enhance the reliability of the LAG. Link aggregation may also be referred to as port trunking, link bundling, network interface bonding, channel, etc. In addition, network interface from multiple network devices may be aggregated, bundled, grouped, etc., to form a LAG. For example, a first set of network interfaces from a first network device may be aggregated with a second set of network interfaces of a second network device to form a LAG. A LAG that includes network interfaces from multiple network devices may be referred to as a multi-chassis link aggregation group (MC-LAG), or a MLAG. As illustrated in FIG. 8, the data plane 540 includes six network interfaces 860. Three of the network interfaces 860 are aggregated into MLAG 870. The MLAG 870 also includes other network interfaces from at least one other network device (not illustrated in FIG. 8). Although a MLAG may be described herein, the implementations, examples, embodiments, etc., described herein may be used in conjunction with LAGs.

In one embodiment, the processing device 530 may determine that the network device 510 will perform a reboot. For example, the processing device 530 may determine that the network device 510 receive a signal, message, request, command, etc., to update the software image 531 of the network device 510 to a new software image. The network device 510 may receive the signal, message, request, command, etc., via a command line interface (CLI), a graphical user interface, etc. The network device 510 may also receive the signal, message, request, command, etc., via a network interface (e.g., a port) of the network device 510 (e.g., may receive a message from a remote server or other computing device). The network device 510 may be rebooted to update, upgrade, etc., the software image 531 (e.g., a current software image) of the network device 531 to the new software image. For example, the network device 510 may be rebooted so that the new software image may take affect (e.g., so that the network device 510 loads the new software image into a memory and executes the new software image). In one embodiment, the new software image may be a different version of the current software image. For example, the new software image may be an updated or newer version of the current software image.

As discussed above, the network device 510 may implement and/or use LACP to operate the MLAG 870. Each network interface 860 in the MLAG 870 may periodically transmit a keep-alive message (e.g., a LACP keep-alive message) to other network devices which have network interfaces that are included in the MLAG 870. This may allow the other network devices to determine whether one of the network interfaces 860 has gone down, crashed, become inoperable, etc. When the MLAG 870 is created, a timeout period may be associated with the MLAG 870 and/or the network interfaces 860 in the MLAG 870. For example, the other network device may determine that one of the network interfaces 860 is down if the other network device does not receive a keep-alive message every 30 seconds, 45 seconds. In one embodiment the LACP service 833 may transmit the keep-alive messages during the normal, standard, general, etc., operation of the network device 530. For example, the LACP service 833 may determine the timeout period (e.g., the time in which the other network device is expecting the keep-alive message) and may transmit the keep-alive messages for the network interfaces 860 before the timeout period expires. The LACP service 833 may transmit a keep-alive message from each network interface 860 in the MLAG 870. For example, every 30 seconds, 45 seconds, or some other appropriate timeout period, the LACP service 833 may transmit a keep-alive message from each network interface 860 to the other network device.

During the reboot of the network device 510, the network device 510 may be unable to transmit keep-alive messages (e.g., LACP keep-alive messages) to indicate that that the network interfaces 860 that are in the MLAG 870 are still active (e.g., still operating, still alive, etc.). For example, the network device 510 may reboot itself to update the software image 531. during the reboot of the network device 510, the LACP service 833 that is included in a new software image (e.g., a newer/updated version of the software image 531) may not be initiated until a certain point in time during the reboot processor and/or after the network device 510 has rebooted. Thus, the network device 510 may not be able to transmit keep-alive messages before a timeout period expires and the other network device may determine that the network interfaces 860 have gone down (e.g., are no longer operational).

In one embodiment, the processing device 530 may save state information that may be used by the network device 510 to process LACP messages. For example, the processing device 530 may store, write, save, etc., the state information in a memory. The memory may be a persistent memory (e.g., a memory that retains data after data is no longer provided to the memory). Examples of a memory may include, but is not limited to, a hard disk drive, flash memory, solid state memory, etc. The state information may include data (e.g., text, numbers, alphanumeric values, lists, tables, or data in various formats) that may allow the network device 510 (e.g., allow the processing device 530 and/or the reboot LACP service 538) to process LACP messages (e.g., to transmit LACP keep-alive messages) during the reboot of the network device 510 (e.g., to continue transmitting LACP keep-alive messages while the network device 510 is still completing a reboot). The processing device 530 may save the state information before the network device 510 is rebooted. The state information may include a list of network interfaces, a list of identifiers for the network interfaces, a list of network addresses, a mapping of network address to network interfaces, a mapping of link layer addresses to network addresses. The state information may also include a set or list of link aggregation groups, a list of network interfaces associated with the set of link aggregation groups (e.g., which network interfaces are associated with which link aggregation groups), and a set of timeout periods associated with the set of link aggregation groups. In one embodiment, the state information may be stored in a JavaScript Object Notation (JSON) format. Although the present disclosure may refer to JSON formats and/or JSON files, other data formats may be used in other embodiments. In one embodiment, one of the processes 532A through 533Z and/or the LACP service 838 may save the state information. For example, when a command is receive to reboot the network device 510 and/or update the software image 531 of the network device 510, one of the processes 532A through 533Z and/or the LACP service 838 may automatically save the state information.

In one embodiment, the processing device 530 may initiate the reboot of the network device, as discussed above. The processing device 530 may initiate the reboot LACP service 538 during the reboot of the network device 510. For example, before the reboot of the network device 510 has completed, the processing device 530 may initiate the reboot LACP service 538. The processing device 530 may imitate the reboot LACP service 538 by instantiating the reboot LACP service 538, beginning execution of the reboot LACP service 538, etc.

In one embodiment LACP service 538 may be initiated early in the reboot process. For example, the LACP service 538 may be one of the first few services that are initiated by the processing device 530 after the network device 510 reboots. The reboot LACP service 538 may be initiated before the services 532A through 532Z and LACP service 533 are initiated.

In one embodiment, the reboot LACP service 538 may be configured to process LACP messages for the network device 530 during the reboot of the network device 530. For example, the reboot LACP service 538 may transmit keep-alive messages (e.g., LACP keep-alive messages) before the network device 530 completes the reboot. Thus, the reboot LACP service 538 may allow the network device 530 to continue processing LACP messages (e.g., transmitting and/or receiving LACP messages) while the network device 530 is still rebooting.

In one embodiment, the reboot LACP service 538 may configure one or more network interfaces of the network device based on the state information when the reboot LACP service 538 is initiated. For example, the reboot LACP service 538 may assign internet layer addresses (e.g., IP addresses) to the network interfaces of the network device 510. The reboot LACP service 538 may assign the internet layer addresses based on the mapping of link layer addresses (e.g., MAC addresses) to internet layer address that indicated in the state information. In a further example, the reboot LACP service 538 may configure types for the network interfaces (e.g., whether the network interface is a switch virtual interface, a routed port, etc.

In one embodiment, the reboot LACP service 538 may configure one or more of a memory, a direct memory access channel, or a data queue based on the state information (e.g., the state information that was saved prior to imitating the reboot of the network device 510) when the reboot LACP service 538 is initiated. For example, state information may include a list of keep-alive messages that should be transmitted for the network interfaces 860 in the MLAG 870. The network device 510 may not have been able to process (e.g., transmit) the LACP messages before the network device 510 was rebooted. The reboot LACP service 538 may configure a memory or a portion of memory for use. The reboot LACP service 538 may allocate a data queue (e.g., an egress queue) to store the keep-alive messages so that the reboot LACP service 538 may transmit the keep-alive messages. The reboot LACP service 538 may also configure one or more direct memory access channels to allow the processing device 530 to access the memory (and/or different portions of the memory). The reboot LACP service 538 may further allocate additional queues, based on the state information.

In one embodiment, the reboot LACP service 538 may configure the network interfaces, one or more memories, one or more direct access channels, one or more data queues, etc., such that the network interfaces, one or more memories, one or more direct access channels, one or more data queues are ready for the network device 510 to use once the network device 510 is rebooted. For example, once the network device 510 is rebooted using a new software image the services 532A through 532Z and/or the LACP service 533 may be able to use the network interfaces, one or more memories, one or more direct access channels, and/or one or more data queues without having to first configure them because they were already configured by the reboot LACP service 538.

In one embodiment the reboot LACP service 538 may process LACP messages by transmitting keep-alive messages. For example, the reboot LACP service 538 may transmit an LACP keep-alive message every 15 seconds. The LACP keep-alive messages may be transmitted while the network device 510 is still rebooting (e.g., before the network device 510 has completed rebooting). In other embodiments, the reboot LACP service 538 may receive LACP messages and may respond to the LACP messages while the network device 510 is still rebooting.

In one embodiment, the processing device 530 may determine whether the LACP service 533 has been initiated. The processing device 530 may determine whether the network device 510 has finished rebooting and/or whether execution of the LACP service 533 was initiated or started. If the LACP service 533 has not been initiated, the processing device 530 may allow the reboot LACP service 538 to continue processing LACP messages (e.g., to continue receiving LACP requests and/or transmitting LACP responses to the LACP requests). If the LACP service 533 has been initiated, the processing device 530 may use the LACP service 533 to process LACP messages (e.g., to transmit LACP keep-alive messages). The LACP service 533 may be configured to process LACP messages after the network device 530 is rebooted and/or after the LACP service 533 has been initiated (e.g., after the LACP service 533 begins executing or starts). The processing device 530 may also stop the reboot LACP service 538 (e.g., may stop the execution of the LACP service 538). Thus, the processing of LACP messages may be performed by (e.g., handed off to) the LACP service 533 after the LACP service 533 is initiated or started. Because the LACP service 533 may take over the processing of LACP messages, the processing device 530 may no longer use the reboot LACP service 538 to process LACP messages so the reboot LACP service 538 may be terminated or stopped. In another embodiment, the reboot LACP service 538 may be a script that is executed by the processing device 530. The reboot LACP service 538 may be deleted or removed after the LACP service 533 has been initiated.

In one embodiment, the ARP service 538 (illustrated in FIG. 5B and discussed in more detail above) and the LACP service 838 may be combined into one service (e.g., a combined service) that process both ARP messages and LACP messages. For example, the ARP service 538 and the LACP service 838 into a single service (e.g., agent, process, etc.) that receives/processes ARP requests, transmits ARP responses, and transmit LACP keep-alive messages. The single service may be referred to as a reboot packet processing device, a fast packet transmit service, etc.

In one embodiment, the LACP service 838 may be included in the software image 531. For example, the reboot LACP service 838 may be part of a current software image that is used by the network device 510. In another example, the reboot LACP service 838 may be include in a new software image (e.g., a new version of the software image 531) that will be used by the network device 510 after the network device 510 is rebooted. As the network device 510 loads, installs, updates, etc., the software image 351 to a new version of the software image, the LACP service 838 that may be in the new version of the software image, may be initiated by the processing device 530.

As discussed above, the network device 510 includes a control plane 520 and a data plane 540. In one embodiment, initiating a reboot of the network device 510 may cause the control plane 520 to reboot. In other embodiments, rebooting the network device 510 may cause both the control plane 520 and the data plane 540 to reboot.

In some embodiments, the reboot LACP service 538 may allow the network device 510 to start processing LACP messages more quickly after the network device 510 is rebooted. For example, because the reboot LACP service 538 is initiated shortly after the reboot of the network device 510 and before the services 532A through 532Z and the LACP service 933, the reboot LACP service 538 may be able to transmit keep-alive messages more quickly while the network device is loading the new software image. This may allow another network device to determine that the network interfaces 860 that are part of the MLAG 870 are still operational. For example, the other network device may not redistribute the load (e.g., the amount of data to transmit/receive) to other network interfaces of the MLAG 870 because the other network device may be able to determine that the network interfaces 860 are still operational.

Figure 9:
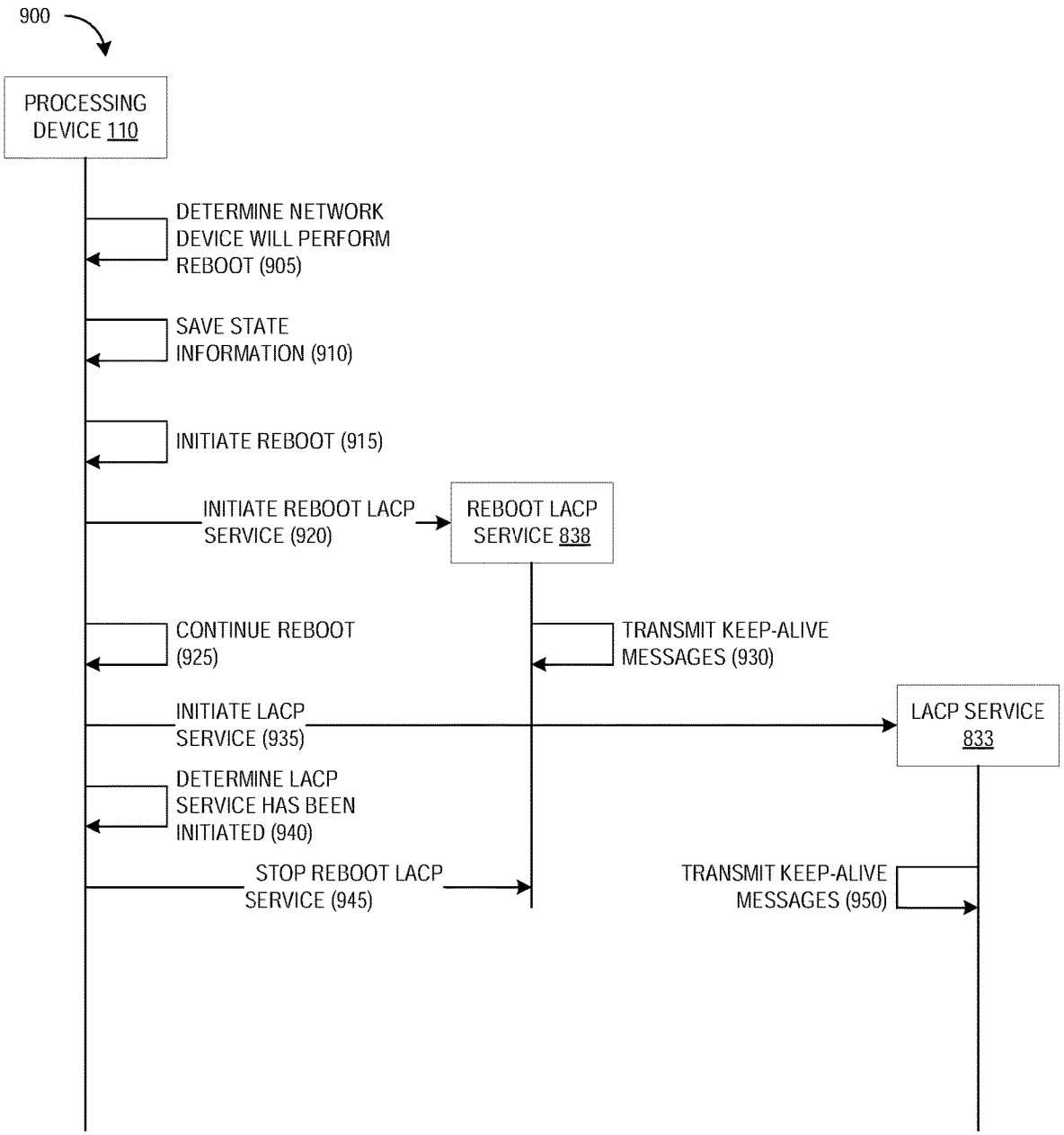
FIG. 9 is a sequence diagram illustrating example actions that may be performed by a processing device and/or a network device, in accordance with one or more embodiments of the present disclosure.

FIG. 9 is a sequence diagram 900 illustrating example actions that may be performed by a processing device 530 and/or a network device (e.g., network device 510 as illustrated in FIG. 8), in accordance with one or more embodiments of the present disclosure. The actions illustrated in the sequence diagram 900 may be performed as part of a reboot or reboot process for the network device 510. At block 905, the processing device may determine that the network device will perform a reboot. For example, the processing device 510 may determine that the network device will perform a reboot within a threshold period of time (e.g., within 15 seconds, within 25 seconds, or within some other appropriate period of time). In another example, the processing device 510 may determine that the network device will reboot due to a software image update. At block 910, the processing device 510 may save state information that may be used to process LACP messages. For example, the processing device 510 may save a list of network interfaces, a list of link aggregation groups, a list of network interfaces in each link aggregation group, etc.

At block 915, the processing device 510 may initiate the reboot of the network device. For example, the processing device 510 may reboot a control plane of the network device. At block the processing device 510 may initiate a reboot LACP service 538. For example, the processing device 510 may begin executing the reboot LACP service 538. At block 925, the processing device 510 may continue rebooting the network device. At block 930, the reboot LACP service 538 may process LACP messages with the network devices continues to reboot. For example, the reboot LACP service 538 may continue to transmit keep-alive messages while the network device 510 continues to reboot. At block 935, the processing device may initiate the LACP service 533. The LACP service 533 may be the standard, general, normal, etc., LACP service that may process LACP services when the network device during standard or normal operation of the network device (e.g., when the network device is not rebooting). At block 940, the processing device 510 may determine that the LACP service 533 has been initiated. The processing device 510 may also determine that the network device has been rebooted (e.g., that the reboot is complete). At block 945, the processing device 510 may stop the reboot LACP service 538 (e.g., may terminate the reboot LACP service 538). At block 950, the LACP service 533 may process LACP messages (e.g., may take over the transmitting the keep-alive messages from the reboot LACP service 538).

Figure 10:
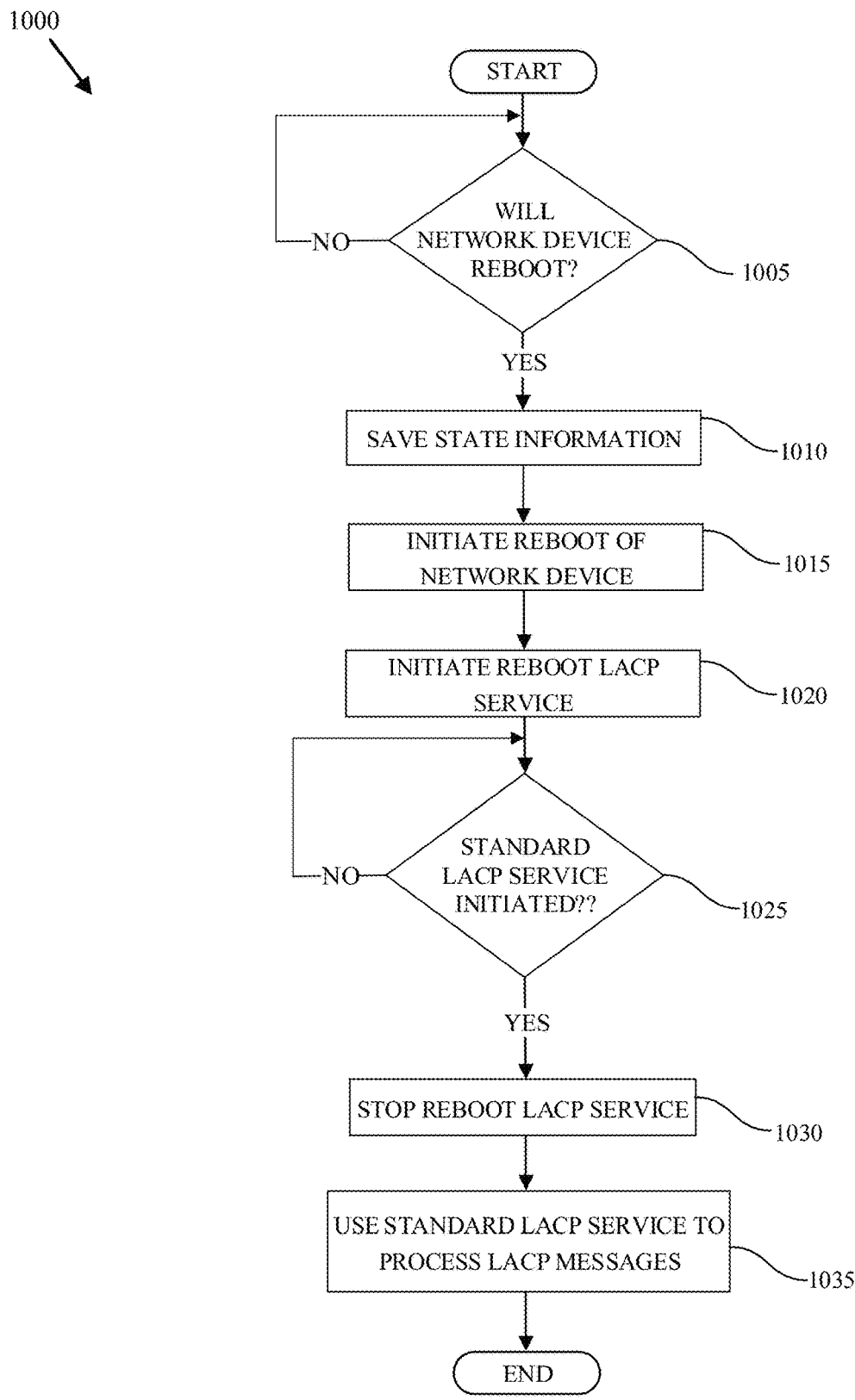
FIG. 10 is a flow diagram of a method of rebooting a network device, in accordance with some embodiments of the present disclosure.

FIG. 10 is a flow diagram of a method 1000 of rebooting a network device, in accordance with some embodiments of the present disclosure. Method 1000 may be performed by processing logic that may comprise hardware (e.g., circuitry, dedicated logic, programmable logic, a processor, a processing device, an ASIC, a FPGA, a central processing unit (CPU), a system-on-chip (SoC), etc.), software (e.g., instructions running/executing on a processing device), firmware (e.g., microcode), or a combination thereof. In some embodiments, the method 1000 may be performed by a network device (e.g., network device 510 illustrated in FIG. 8), and/or a processing device (e.g., processing device 530 illustrated in FIG. 8). It should be appreciated that the actions of the method 1000 in FIG. 10 can be performed in differing orders, groupings, or subsets than shown in FIG. 10, for various purposes or user preferences.

At block 1000, the method 1000 may determine whether the network device will perform a reboot (e.g., due to a software image upgrade/update). If the network device will not perform a reboot, the method 1000 may proceed back to block 1005. If the network device will perform a reboot, the method 1000 may proceed to block 1010 where the method 1000 may store or save state information (e.g., a list of network interfaces, a list of network addresses, etc.). At block 1015, the method 1000 may initiate the reboot of the network device (e.g., reboot the control plane of the network device). At block 1020, the method may initiate a reboot LACP service. The reboot LACP service may process LACP packets during the reboot of the network device. For example, the reboot LACP service may transmit keep-alive messages. At block 1025, the method 1000 may continue with the reboot of the network device and may determine whether the standard LACP service (e.g., the LACP service that may be included in the new or update software image) has been initiated. If the standard LACP service has not been initiated, the method 1000 may proceed back to block 1025. If the standard LACP service has been initiated, the method 1000 may proceed to block 1030 where the method 1000 stops the LACP reboot service. At block 1035, the method 1000 may use the standard LACP service to process LACP messages. For example, the method 1000 may use the standard LACP service to transmit keep-alive messages.

Figure 11:
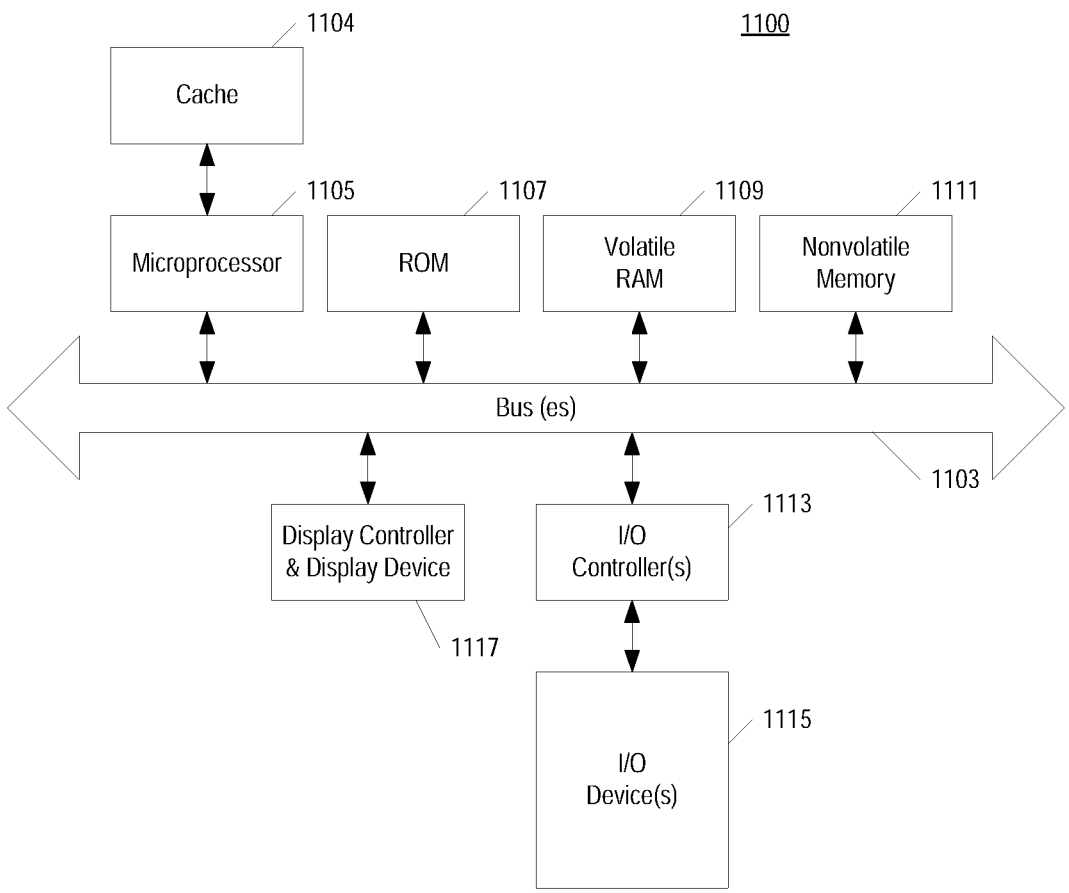
FIG. 11 shows one example of a data processing system, which may be used with one embodiment of the present disclosure.

FIG. 11 shows one example of a data processing system 1100, which may be used with one embodiment of the present disclosure. For example, the system 1100 may be implemented including a network device 100 as shown in FIG. 1. Note that while FIG. 11 illustrates various components of a computer system, it is not intended to represent any particular architecture or manner of interconnecting the components as such details are not germane to the present disclosure. It will also be appreciated that network computers and other data processing systems or other consumer electronic devices, which have fewer components or perhaps more components, may also be used with the present disclosure.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1117 and to peripheral devices such as input/output (I/O) devices which may be mice, keyboards, modems, network interfaces, printers and other devices which are well known in the art. In one embodiment, the system 1100 includes a plurality of network interfaces of the same or different type (e.g., Ethernet copper interface, Ethernet fiber interfaces, wireless, and/or other types of network interfaces). In this embodiment, the system 1100 can include a forwarding engine to forward network date received on one interface out another interface.

Typically, the input/output devices 1115 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1111 will also be a random access memory although this is not required. While FIG. 9 shows that the mass storage 1111 is a local device coupled directly to the rest of the components in the data processing system, it will be appreciated that the present disclosure may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Figure 12:
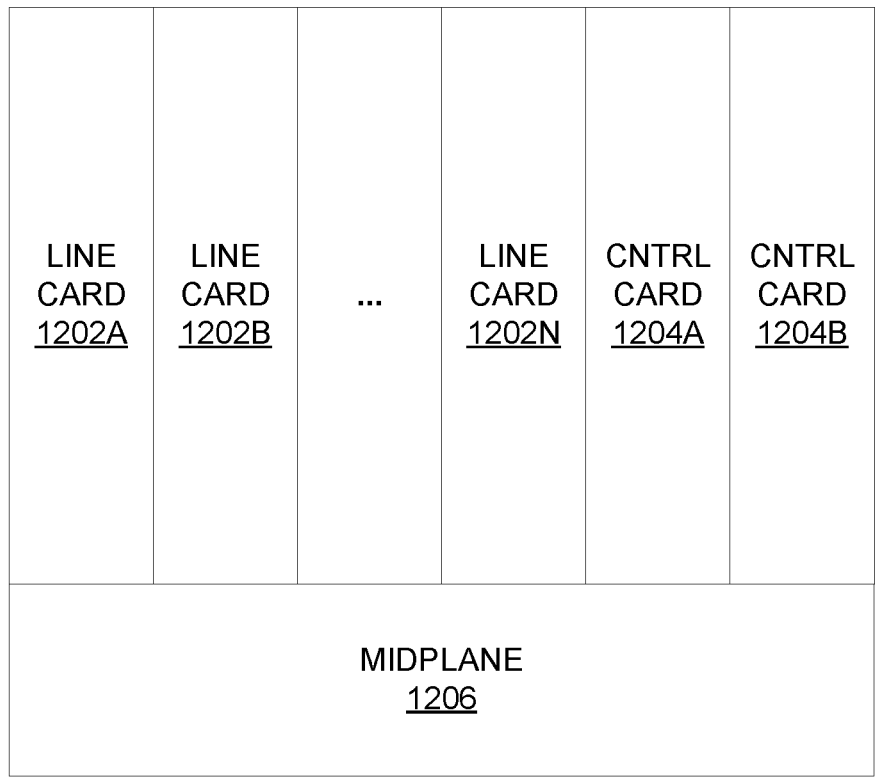
FIG. 12 is a block diagram of one embodiment of an exemplary network device that may reboot.

FIG. 12 is a block diagram of one embodiment of an exemplary network device 1200 that may reboot. In FIG. 12, the midplane 1206 couples to the line cards 1202A-N and controller cards 1204A-B. The midplane 1206 may also be referred to as a fabric. While in one embodiment, the controller cards 1204A-B control the processing of the traffic by the line cards 1202A-N, in alternate embodiments, the controller cards 1204A-B, perform the same and/or different functions (e.g., updating a software image on the network device, etc.). In one embodiment, the line cards 1202A-N process and forward traffic according to the network policies received from the controller cards 1204A-B. In one embodiment, the controller cards 1204A-B update a software image on the network device as described above. In this embodiment, one or both of the controller cards include services that may continue to process messages, packets, etc., such as the reboot ARP service 538 and the reboot LACP service 838 as described in FIGS. 5B and 8. It should be understood that the architecture of the network device 1200 illustrated in FIG. 12 is exemplary, and different combinations of cards may be used in other embodiments of the disclosure.

Although the present disclosure may refer to processing ARP and/or LACP messages, the embodiments, examples, and/or implementations described herein may applied to other types of messages and/or processing. For example, other address resolution messages (e.g., Neighbor Discovery Protocol (NDP)) may be used in other embodiments. In another example, the embodiments, examples, and/or implementations may be used to process and/or respond to messages while a network device is still rebooting.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two blocks in a figure shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the disclosure is not to be limited to the details given herein, but may be modified within the scope and equivalents of the appended claims.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "saving," "initiating," "transmitting," "receiving," "using," "configuring," "writing," analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

What is claimed is:

1. A method, comprising:
    determining that a network device will perform a reboot, wherein the network device comprises a set of network interfaces that are part of a link aggregation group;
    storing state information, wherein the state information comprises data used by the network device to process link aggregation control protocol (LACP) messages;
    initiating the reboot of the network device;
    initiating a first LACP service, wherein the first LACP service is configured to process LACP messages during the reboot of the network device;
    determining whether a second LACP service has been initiated; and
    in response to determining that the second LACP service has been initiated:
        using the second LACP service, instead of the first LACP service, to process LACP messages, wherein the second LACP service is configured to process LACP messages after the second LACP service is initiated; and
        stopping the first LACP service.

2. The method of claim 1, wherein the first LACP service is configured to process LACP messages before the network device completes the reboot.

3. The method of claim 1, wherein initiating the first LACP service comprises: configuring one or more network interfaces of the network device based on the state information.

4. The method of claim 1, wherein initiating the first LACP service comprises: configuring one or more of a memory, a direct memory access channel, or a data queue, based on the state information.

5. The method of claim 1, wherein to process LACP messages the first LACP service is further configured to:
 transmit LACP keep-alive messages to a second network device.

6. A network device, comprising:
 a memory; and
 a processing device coupled to the memory, the processing device configured to:
  determine that a network device will perform a reboot, wherein the network device comprises a set of network interfaces that are part of a link aggregation group;
  store state information in the memory, wherein the state information comprises data used by the network device to process link aggregation control protocol (LACP) messages;
  initiate the reboot of the network device;
  initiate a first LACP service, wherein the first LACP service is configured to process LACP messages during the reboot of the network device;
  determine whether a second LACP service has been initiated; and
  in response to determining that the second LACP service has been initiated:
   use the second LACP service, instead of the first LACP service, to process LACP messages, wherein the second LACP service is configured to process LACP messages after the second LACP service is initiated; and
   stop the first LACP service.

7. The network device of claim 6, wherein the first LACP service is further configured to process LACP messages before the network device completes the reboot.

8. The network device of claim 6, wherein the processing device is further configured to initiate the first LACP service by configuring one or more network interfaces of the network device based on the state information.

9. The network device of claim 6, wherein the processing device is further configured to initiate the first LACP service by configuring one or more of a memory, a direct memory access channel, or a data queue, based on the state information.

10. The network device of claim 6, wherein to process LACP messages the first LACP service is further configured to:
 transmit LACP keep-alive messages to a second network device.

11. A non-transitory computer-readable medium storing instructions which, when executed by one or more processing devices of a network device, cause the one or more processing devices to perform operations comprising:
 determining that the network device will perform a reboot, wherein the network device comprises a set of network interfaces that are part of a link aggregation group;
 storing state information, wherein the state information comprises data used by the network device to process link aggregation control protocol (LACP) messages;
 initiating the reboot of the network device;
 initiating a first LACP service, wherein the first LACP service is configured to process LACP messages during the reboot of the network device;
 determining whether a second LACP service has been initiated; and
 in response to determining that the second LACP service has been initiated:
  using the second LACP service, instead of the first LACP service, to process LACP messages, wherein the second LACP service is configured to process LACP messages after the second LACP service is initiated; and
  stopping the first LACP service.

12. The computer-readable medium of claim 11, wherein the first LACP service is further configured to process LACP messages before the network device completes the reboot.

13. The computer-readable medium of claim 11, wherein initiating the first LACP service comprises configuring one or more network interfaces of the network device based on the state information.

14. The computer-readable medium of claim 11, wherein initiating the first LACP service comprises configuring one or more of a memory, a direct memory access channel, or a data queue, based on the state information.

15. The computer-readable medium of claim 11, wherein to process LACP messages the first LACP service is further configured to:
 transmit LACP keep-alive messages to a second network device.

* * * * *